United States Patent
Pedro

(10) Patent No.: US 12,285,877 B2
(45) Date of Patent: Apr. 29, 2025

(54) SELECTOR FOR ROBOT-RETRIEVABLE ITEMS

(71) Applicant: Ocado Innovation Limited, Hatfield (GB)

(72) Inventor: Osemwaro Jeremiah Oghenetega Pedro, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 291 days.

(21) Appl. No.: 18/041,012

(22) PCT Filed: Aug. 9, 2021

(86) PCT No.: PCT/EP2021/072179
§ 371 (c)(1),
(2) Date: Feb. 8, 2023

(87) PCT Pub. No.: WO2022/034032
PCT Pub. Date: Feb. 17, 2022

(65) Prior Publication Data
US 2023/0356403 A1 Nov. 9, 2023

(30) Foreign Application Priority Data
Aug. 11, 2020 (GB) .................................. 2012459

(51) Int. Cl.
*B25J 9/16* (2006.01)
*B25J 19/02* (2006.01)
(Continued)

(52) U.S. Cl.
CPC ........... *B25J 9/1697* (2013.01); *B25J 9/1612* (2013.01); *G06T 7/13* (2017.01); *G06T 7/50* (2017.01); *G06T 2207/10028* (2013.01)

(58) Field of Classification Search
CPC .... B65G 1/0478; B65G 1/137; B65G 1/1371; B65G 1/1378; B65G 1/0421;
(Continued)

(56) References Cited

U.S. PATENT DOCUMENTS

2018/0075402 A1 3/2018 Stadie et al.
2018/0276606 A1 9/2018 Stadie et al.
(Continued)

FOREIGN PATENT DOCUMENTS

NO 317366 B1 10/2004
WO 9849075 A1 11/1998
(Continued)

OTHER PUBLICATIONS

Du et al., "Vision-based Robotic Grasping From Object Localization, Object Pose Estimation To Grasp Estimation for Parallel Grippers: A Review", Org, Cornell University Library, May 16, 2019, XP081656318, 39 pages. (Year: 2019).*
(Continued)

*Primary Examiner* — Dale Moyer
*Assistant Examiner* — Alyse Tramanh Tran
(74) *Attorney, Agent, or Firm* — Buchanan Ingersoll & Rooney PC

(57) ABSTRACT

A retrieval controller is disclosed for identifying an item to be retrieved from a flat storage surface by a robot for identifying one item, amongst items stored on a common surface that can be retrieved by a robot equipped with a lateral-motion gripper. The retrieval controller includes: a depth map computing unit configured to establish a global coordinate system, and establish an orthonormal set of basis vectors u, v and w defined in the global coordinate system, where w is approximately orthogonal to the surface that the items are stored on; a vector determination unit; an item selection unit; and a robot instructing unit configured to
(Continued)

instruct the robot to retrieve the item based on uv coordinates of one or more w-aligned edges having associated quadrilateral-based, right prisms which do not have interiors that intersect any right, enclosing prisms selected by the item selection unit.

23 Claims, 11 Drawing Sheets

(51) Int. Cl.
    *G05B 19/418* (2006.01)
    *G06T 1/00* (2006.01)
    *G06T 7/12* (2017.01)
    *G06T 7/13* (2017.01)
    *G06T 7/50* (2017.01)

(58) Field of Classification Search
    CPC .............. B65G 1/0407; B65G 1/0457; B65G 2201/0235; B65G 47/52; B65G 47/914; B65G 59/02; G06Q 10/08; B66F 9/063; G05B 19/41895; G05B 2219/39484; G05B 2219/40053; G05B 2219/40563; B25J 9/1697; B25J 9/1612; G06T 7/50; G06T 7/13; G06T 2207/10028
    See application file for complete search history.

(56) References Cited

U.S. PATENT DOCUMENTS

| | | |
|---|---|---|
| 2018/0276607 A1 | 9/2018 | Stadie et al. |
| 2018/0276608 A1 | 9/2018 | Stadie et al. |
| 2020/0012268 A1 | 1/2020 | Stadie et al. |
| 2021/0149382 A1 | 5/2021 | Stadie et al. |

FOREIGN PATENT DOCUMENTS

| | | |
|---|---|---|
| WO | 2015019055 A1 | 2/2015 |
| WO | 2015185628 A2 | 12/2015 |
| WO | 2019097004 A1 | 5/2019 |
| WO | 2019169419 A2 | 9/2019 |

OTHER PUBLICATIONS

Chan, "Optimal Output-Sensitive Convex Hull Algorithms in Two and Three Dimensions", Discrete Computational Geometry, vol. 16, 1996, pp. 361-368.

Cocias et al., "Multiple-Superquadrics based Object Surface Estimation for Grasping in Service Robotics", Optimization Of Electrical And Electronic Equipment (OPTIM), May 24, 2012, pp. 1471-1477.

Du et al., "Vision-based Robotic Grasping From Object Localization, Object Pose Estimation To Grasp Estimation for Parallel Grippers: A Review", Org, Cornell University Library, May 16, 2019, XP081656318, 39 pages.

Golovinskiy et al., "Min-Cut Based Segmentation of Point Clouds", in proceedings of the IEEE Workshop on Search in 3D and Video (S3DV), 2009, 8 pages.

Golub et al., "Matrix Computations", John Hopkins University Press, 1996, pp. 1-723.

Moller, "A Fast Triangle-Triangle Intersection Test", in Journal of Graphics Tools, 1997, pp. 1-5.

O'Rourke, "Computational Geometry in C", Cambridge University Press, 1998, 358 pages.

Rusu et al., "Close-range Scene Segmentation and Reconstruction of 3D Point Cloud Maps for Mobile Manipulation in Domestic Environments", in proceedings of the IEEE/RSJ International Conference on Intelligent Robots and Systems (IROS), 2009, 7 pages.

Rabbani et al., "Segmentation of Point Clouds Using Smoothness Constraint", in proceedings of the ISPRS Commission V Symposium "Image Engineering and Vision Metrology", 2006; pp. 248-253.

Toussaint, "Solving Geometric Problems with the Rotating Calipers", proceedings of the IEEE Mediterranean Electrotechnical Conference (MELECON), 1983, pp. 1-8.

You et al., "Mode 1-Free Grasp Planning for Configurable Vacuum Grippers", IEEE/RSJ International Conference On Intelligent Robots And Systems (!ROS), Oct. 1, 2018, pp. 4554-4561.

Combined Search and Examination Report issued in corresponding Patent Application No. GB2111455.8 dated Jan. 14, 2022.

International Search Report (PCT/ISA/210) and Written Opinion (PCT/ISA/237) mailed on Dec. 2, 2021, by the European Patent Office as the International Searching Authority for International Application No. PCT/EP2021/072179.

Search Report under Section 17 issued in corresponding Patent Application No. GB2012459.0 dated Jan. 12, 2021.

Search Report under Section 17(5) issued in corresponding Patent Application No. GB2012459.0 dated Jan. 13, 2021.

Office Action (Examination Report No. 1) issued on Apr. 3, 2024, by the Australian Patent Office in corresponding Australian Patent Application No. 2021324053. (4 pages).

Office Action issued on May 30, 2024, by the Canadian Patent Office in corresponding Canadian Patent Application No. 3,190,171. (3 pages).

* cited by examiner

SELECTOR FOR ROBOT-RETRIEVABLE ITEMS

TECHNICAL FIELD

The present invention relates generally to the field of vision-guided robotics and the use of visually-guided robots as retrieval systems in, for example, warehouses.

BACKGROUND

A common practice, when preparing items of a given type for warehouse storage, is to pack the items onto flat surfaces, and to stack these layers of items on top of each other (on pallets), to save space. Automating the process of retrieving items stored in this manner often proves to be more cost-effective than using manual labourers. In highly-controlled environments in which the items are always kept in known locations (or in which the items can always be manoeuvred into known locations), and in which the destinations that the items must be moved to are fixed and in a known state (e.g. free of obstruction), such automation can be achieved by "blind" material handling equipment that does not rely on sensors to locate either the items or their destinations. However, in environments in which it is not practical, feasible or desirable to impose strict constraints on the locations of the items or on the location or state of their destinations, the information about the locations and destinations of the items must come from sensor readings, and the machines used to retrieve and move the items must be flexible enough to be able to cope with any variations that may arise in their locations and destinations. In order to satisfy the latter requirement, it will typically be necessary to use some form of programmable industrial robot.

Over the past few years, an ever-growing range of Depth Sensors have become commercially available that are capable of producing real-time Depth Maps or 3D Point Clouds that can be used to determine the locations of objects up to 2 m away to sub centimetre accuracy. The low cost of some of these sensors, together with their satisfactory level of accuracy, makes them an attractive option for a sensor-based retrieval system.

Given a Depth Sensor that is in a known position relative to a robot and that is observing the items that are to be retrieved, it will be necessary at some point for the retrieval system to select which item or items to retrieve next. The question of which items can be retrieved depends on what kind of gripper the robot is equipped with, as this determines the directions that the gripper can move in when approaching the items. A gripper that approaches the items from above, and that only needs to make contact with the uppermost surface of each item, can always grasp every item, if the items do not overlap each other. But a gripper that must approach the items with a motion that has a horizontal component, or that needs to make contact with the sides of each item, cannot grasp an item if the space that it must move through en-route to that item's grasp points is occupied by any other items. Thus, when using such a gripper, the process of selecting which item to retrieve next must be based on an assessment of which items appear to have sufficient clearance in the 3D Point Cloud data acquired from the Depth Sensor. Henceforth such grippers will be referred to as "lateral-motion grippers".

SUMMARY

In view of the problems of identifying one item amongst a collection of items stored on a common surface that can be retrieved by a robot equipped with a lateral-motion gripper, the present invention aims to provide an apparatus and method for retrieval of such items by way of automated means.

According to the present invention there is provided a retrieval controller for identifying an item to be retrieved from a flat storage surface by a robot. The retrieval controller comprises a depth map computing unit arranged to establish a global coordinate system, establish an orthonormal set of basis vectors u, v and w defined in the global coordinate system, where w is approximately orthogonal to the surface that the items are stored on, receiving a depth map from a depth sensor, converting the received depth map into a 3D Point Cloud defined in the global coordinate system, computing a representation of a partitioning into segments of the 3D Points of the 3D Point Cloud such that a segment contains a pair of 3D Points only if the 3D points should be considered to be part of the surface of the same item and a prism calculating unit arranged to compute a right, enclosing prism for each segment. The retrieval controller further comprises a vector determination unit arranged to compute each of: a) outwards-pointing normal of each w-aligned face of each computed right, enclosing prism, b) outwards-pointing normal of each w-aligned edge of each computed right, enclosing prism and c) which w-aligned edges of each computed right, enclosing prism correspond to grasp points that should be precluded from an item selection process. Moreover, the retrieval controller comprises an item selection unit arranged to iterate over the w-aligned edges of each right, enclosing prism, that do not correspond to grasp points that should be precluded from the item selection process, computing a pair of quadrilateral-based, right prisms for each such a w-aligned edge, checking whether or not the interior of either of the two quadrilateral-based, right prisms associated with a w-aligned edge intersects any of the right, enclosing prisms and a robot instructing unit arranged to instruct the robot to retrieve the item based on uv coordinates of one or more w-aligned edges whose associated quadrilateral-based, right prisms do not have interiors that intersect any of the right, enclosing prisms as selected by the item selection unit.

Moreover, the present invention further provides a system comprising a depth sensor for generating a depth map of an item stored on one or more stacked surfaces, a robot for grasping the item and a retrieval controller as previously described arranged to control the robot to grasp the item.

In addition, the present invention further provides a storage system comprising a first set of parallel rails or tracks extending in an X-direction, and a second set of parallel rails or tracks extending in a Y-direction transverse to the first set in a substantially horizontal plane to form a grid pattern comprising a plurality of grid spaces, a plurality of stacks of containers located beneath the rails, and arranged such that each stack is located within a footprint of a single grid space, at least one transporting device, the at least one transporting device being arranged to selectively move in the X and/or Y directions, above the stacks on the rails and arranged to transport a container, a picking station arranged to receive a container transported by the at least one transporting device, and a system as previously described, wherein the system is arranged to grasp an item and place it in a container at the picking station.

The present invention also provides a method of identifying an item to be retrieved from a flat storage surface by a robot. The method comprises the steps of establishing a global coordinate system, establishing an orthonormal set of basis vectors u, v and w defined in the global coordinate system, where w is approximately orthogonal to the surface that the items are stored on, receiving a depth map from a depth sensor, converting the received depth map into a 3D Point Cloud defined in the global coordinate system, computing a representation of a partitioning into segments of the 3D Points of the 3D Point Cloud that were observed to be lying on the surfaces of the items that are to be retrieved, such that a segment contains a pair of 3D Points only if the 3D points should be considered to be part of the surface of the same item. The method further comprises the steps of computing a right, enclosing prism for each segment, computing the outwards-pointing normal of each w-aligned face of each right, enclosing prism, computing the outwards-pointing normal of each w-aligned edge of each right, enclosing prism, computing which w-aligned edges of each right, enclosing prism correspond to grasp points that should be precluded from an item selection process, iterating over the w-aligned edges of each right, enclosing prism, that do not correspond to grasp points that should be precluded from the item selection process, computing a pair of quadrilateral-based, right prisms for each such a w-aligned edge. The method further comprises the steps of checking whether or not the interior of either of the two quadrilateral-based, right prisms associated with a w-aligned edge intersects any of the right, enclosing prisms, instructing the robot to retrieve the item based on the uv coordinates of one or more w-aligned edges whose associated quadrilateral-based, right prisms do not have interiors that intersect any of the right, enclosing prisms.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Figure 1:
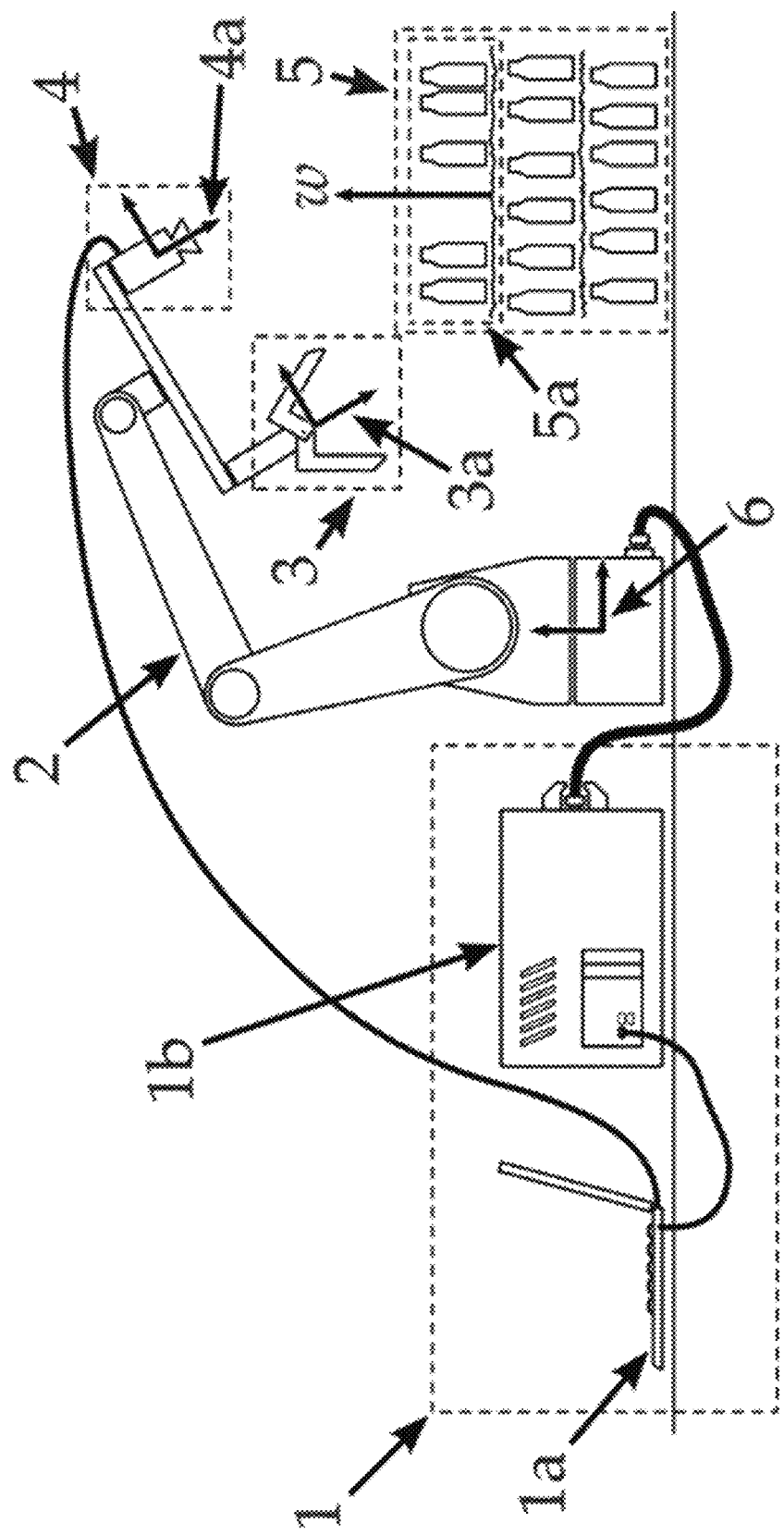
FIG. 1 illustrates one possible embodiment of the present invention, featuring a single industrial robot 2 with a Retrieval Controller 1 that comprises a single laptop 1a and a single robot controller 1b.

With reference to FIG. 1, which illustrates one potential physical setup of one possible embodiment of the invention, the present embodiment provides a controller for a retrieval controller 1 for controlling an industrial robot 2.

The industrial robot 2 is for picking an item from a pallet comprising stacked surfaces 5. The items on stacked surfaces 5 and that are to be retrieved are stored on one or more stacked surfaces 5, and each item is always removed from the uppermost layer 5a of the stack.

To achieve the picking of an item, each item is arranged within the reach of the industrial robot 2. Although FIG. 1 only depicts a single industrial robot 2 it is envisaged that more than one industrial robot 2 may be used to accomplish the task of picking items.

To achieve good results in picking items, it may be necessary to provide estimates of the positions and orientations of the industrial robot 2 in a global coordinate system 6.

The Retrieval Controller 1 is arranged to control the retrieval of items by way of Digital Images which it receives from at least one Depth Sensor 4. Consequently the Retrieval Controller 1 issues motion commands to the Industrial Robot 2.

The industrial robot 2 is equipped with at least one gripper 3 that can be used to grasp the items, and each such gripper is associated with a coordinate system 3a that is in a fixed position and orientation relative to the gripper.

The Retrieval Controller 1 can transmit instructions to each industrial robot 2 that a gripper is attached to, commanding it to move the gripper so that its associated coordinate system ends up in any given reachable position and orientation in the global coordinate system.

Before each item is retrieved, one or more Depth Sensors 4 are positioned and oriented such that each item that can be retrieved from the uppermost layer 5a is visible to at least one of the Depth Sensors 4. In one possible embodiment of the invention, the Depth Sensors 4 are all rigidly connected to static mount points throughout the retrieval process and are not intentionally moved.

In another possible embodiment, at least one of the Depth Sensors 4 is rigidly mounted to a robot, so that the positions and orientations of the Depth Sensors 4 that are so mounted may be changed by the robots that they are mounted to, and any remaining Depth Sensors 4 are rigidly attached to static mount points. Estimates of the positions and orientations of the Depth Sensors' coordinate systems 4a in the global coordinate system 6 are available in all embodiments, which allows the Retrieval Controller 1 to estimate the positions of surface points of the item in the global coordinate system 6 based on the Depth measurements obtained from the depth sensor 4.

The present embodiment is arranged to treat each item as if the gripper can only approach it from a finite set of directions and treat the region of space that the gripper must move through when approaching an item as a right prism with sides that are orthogonal to the surface that the item is on.

To achieve the effect of determining and picking an item from the stacked surfaces 5, the Retrieval Controller comprises a depth map computing unit, a prism calculating unit, a vector determination unit, an item selection unit and a robot instructing unit.

The depth map computing unit is arranged, given one or more appropriately positioned and oriented Depth Sensors 4, the first step of the item selection process is for the Retrieval Controller to:
  a. capture one or more Depth Maps;
  b convert the Depth Maps to 3D Point Clouds defined in the global coordinate system 6;
  c. transform the 3D Point Clouds into a single 3D Point Cloud (e.g. by appending, averaging or discarding 3D Points), if more than one has been constructed;
  d. remove the background from the resulting 3D Point Cloud, so that the remaining 3D Points lie on the surfaces of the items; and
  e. segment the remaining 3D Points into individual items.

The first three steps involve mathematical procedures that are well-known in the computer vision and computer graphics communities. The final two steps involve executing an algorithm that partitions the foreground 3D Points into "segments"-sets of 3D Points such that two 3D Points are contained in the same set if and only if the algorithm considers them to be part of the surface of the same item. The computer vision literature is replete with 3D Point Cloud segmentation and background removal algorithms, such as those published in:

R. B. Rusu et al., "Close-range Scene Segmentation and Reconstruction of 3D Point Cloud Maps for Mobile Manipulation in Domestic Environments", in proceedings of the IEEE/RSJ International Conference on Intelligent Robots and Systems (IROS), 2009;

T. Rabbani et al., "Segmentation of Point Clouds Using Smoothness Constraint", in proceedings of the ISPRS Commission V Symposium "Image Engineering and Vision Metrology", 2006; and Golovinskiy and T. Funkhouser, "Min-Cut Based Segmentation of Point Clouds", in proceedings of the IEEE Workshop on Search in 3D and Video (S3DV), 2009.

The contents of each of the three above documents being hereby incorporated by reference.

The question of which algorithms are most appropriate depends on the visual characteristics of the items.

In other words, the depth map computing unit is arranged to establish a global coordinate system, establish an orthonormal set of basis vectors u, v and w defined in the global coordinate system, where w is approximately orthogonal to the surface that the items are stored on, receiving a depth map from a depth sensor, converting the received depth map into a 3D Point Cloud defined in the global coordinate system, computing a representation of a partitioning into segments of the 3D Points of the 3D Point Cloud such that a segment contains a pair of 3D Points only if the 3D points should be considered to be part of the surface of the same item.

Right, Enclosing Prism Construction

The prism construction is achieved with the prism calculating unit which is arranged to compute a right, enclosing prism for each segment.

This may be achieved using the result of partitioning a 3D Point Cloud into segments representing distinct items, the next step of the item selection process is to compute a right, enclosing prism ("RE prism" for short) for each segment. All embodiments of the invention use the RE prisms as geometrically simple approximations of the shapes of the items, for the purposes of estimating the positions of potential grasp points and estimating the regions of space that the gripper 3 will have to move through when approaching the grasp points. In particular, the selection process assumes that the grasp points lie on the edges of the RE prisms that connect their upper and lower bases, and that the region of space that the gripper 3 will move through while approaching a grasp point corresponding to one of these edges is contained within a right, prismatic region that touches the edge and its two adjacent faces.

Figure 2:
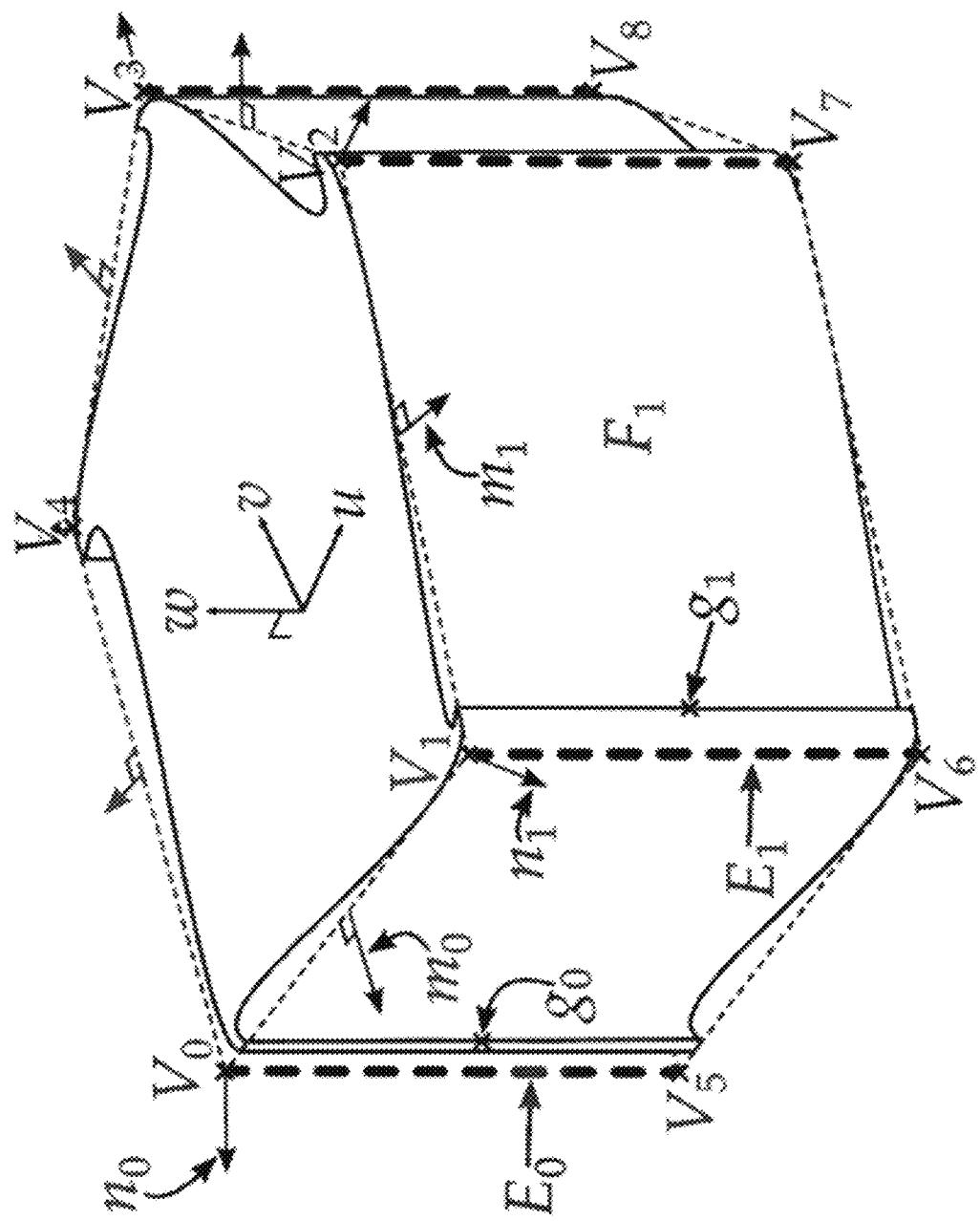
FIG. 2 illustrates a hypothetical stored item within a right, enclosing prism, with some ideal grasp points $g_0$ and $g_1$ that correspond, respectively, to edges $E_0$ and $E_1$ of the enclosing prism.

The Retrieval Controller 1 may be further arranged to construct RE prisms with the following properties:
  a. the base of each RE prism is a simple polygon that is orthogonal to the unit vector w, which, as illustrated in FIG. 2, is approximately orthogonal to the surface that the items are stored on;
  b. each RE prism contains all of the 3D Points in the associated segment; and
  c. subject to the first two properties and to any additional properties that may need to be placed on the bases of the RE prisms, such as matching a predefined template in some item-specific sense, each RE prism has a minimal volume.

FIG. 2 illustrates a pentagonal, minimal volume, RE prism (drawn in dashed lines) enclosing a hypothetical item (drawn in solid lines) that satisfies these properties. The base of the prism is the smallest pentagon that encloses the orthographic projection of the item's surface onto the uv plane.

The first property is trivial to enforce, given w. It is also simple to calculate a unit vector w that is approximately orthogonal to the storage surface, as, in all embodiments: the storage surfaces are roughly parallel to each other; the angles between the floor's normal and the normals of the storage surfaces do not vary much (in fact, the storage surfaces are roughly parallel to the floor in most cases); and the global coordinate system 6 can be defined as being fixed relative to the floor. Thus, the orientation of the unit vector w can be calculated by capturing a 3D Point Cloud of an empty storage surface in the global coordinate system 6, fitting a plane to the 3D Points lying on the surface, and setting w to the unit vector that is proportional to the vector formed by the coefficients of the first-degree terms in the equation defining the plane. Alternatively, if the floor is approximately orthogonal to an axis of the global coordinate system 6, w can be defined to be equal to that axis.

To construct an RE prism that satisfies the properties, the Retrieval Controller 1 may be further arranged to:
  a. choose a pair of vectors u and v such that u, v and w form an orthonormal basis;
  b. project each segment's 3D Points onto the 2D subspace spanned by u and v;
  c. compute an appropriate polygon that encloses the 2D projections of the points and that can serve as a base for the RE prism. Let the vertices of this polygon, when arranged in either clockwise or anticlockwise order, be $p_0, p_1, \ldots, p_{h-1}$, where: h is the number of vertices, the first element of each vertex is the vertex's projection onto the u axis, and the second element is its projection onto the v axis;
  d. calculate the RE prism's vertices, given by the columns of the matrix V defined as:

$$V = (u \ v \ w) \begin{pmatrix} p_0 & p_1 & \cdots & p_{h-1} & p_0 & p_1 & \cdots & p_{h-1} \\ w_1 & w_1 & \cdots & w_1 & w_0 & w_0 & \cdots & w_0 \end{pmatrix}.$$

where $w_0$ and $w_1$ are, respectively, the desired minimal and maximal positions of the prism's base faces along the w axis (an embodiment may, for example, set them to the minimum and maximum projections of the segment's 3D Points onto the w axis).

Given w, the choice of vectors u and v that complete the orthonormal basis is arbitrary, as all possible choices will give rise to the same RE prism. In an embodiment of the invention in which w is equal to an axis of the global coordinate system 6, the simplest choice of values for u and v is to set them to the other two axes. A more general way to choose values for u and v, that can be used in any embodiment, is to compute w's singular value decomposition (SVD) and to set them to the two left-singular vectors that correspond to the null singular value. The computation of the SVD is a well-studied problem and is described, for instance, in Golub and Van Loan, "Matrix Computations", John Hopkins University Press, 1996 which is incorporated herein by reference.

While simplicity of the polygon is a preferred route for an embodiment of the present invention, it is envisaged that other kinds of polygons can be used to define the base of the RE prisms. In particular, it is worth noting that many items commonly stored in warehouses can be well approximated by cuboid-shaped RE prisms. When such an approximation can be made, an appropriate solution to step c of the RE prism construction process above may involve computing a minimal-area enclosing rectangle. One solution is to first of all compute the convex hull of the points, and then compute the smallest rectangle that encloses the convex hull's vertices. An efficient algorithm for computing convex hulls is given in T. M. Chan, "Optimal Output-Sensitive Convex Hull Algorithms in Two and Three Dimensions", Discrete Computational Geometry, Vol. 16, 1996, and an efficient algorithm for computing the smallest rectangle that encloses a convex polygon is given in G. Toussaint, "Solving Geometric Problems with the Rotating Calipers", proceedings of the IEEE Mediterranean Electrotechnical Conference (ME-LECON), 1983. Both of these documents being incorporated herein by reference. If the rectangular base is required to match a template in the sense of having fixed-length sides, it is trivial to adjust the side lengths of the minimal-area enclosing rectangle while preserving its orientation and the position of its centre.

RE Prism Features

The vector determination unit arranged to compute each of:
 a. outwards-pointing normal of each w-aligned face of each computed right, enclosing prism,
 b. outwards-pointing normal of each w-aligned edge of each computed right, enclosing prism.

Further detail of the vector determination unit is provided below.

As mentioned earlier, the item selection process assumes that an item's grasp points lie on the edges of an RE prism that connect the prism's lower base to its upper base. These edges will be referred to as "w-aligned edges" from now on, as they are parallel to the w axis. Moreover, the faces that contain the "w-aligned edged" will be referred to as "w-aligned faces", for the same reason. With reference to FIG. 2 as an illustrative example:

a. $E_i$ denotes the w-aligned edge defined by vertices $V_i$ and $V_{i+h}$, where $V_i$ is the ith column of the V matrix of vertices that is defined in step d, defined above;
 b. $F_i$ denotes the w-aligned face defined by vertices $V_i$, $V_{i+1}$, $V_{i+h}$, and $V_{i+h+1}$;
 c. $m_i$ denotes the outwards-pointing normal of the w-aligned face $F_i$, defined by rotating $$\frac{V_{i+1} - V_i}{\|V_{i+1} - V_i\|}$$

90° clockwise n the vertices are arranged in anticlockwise order, or rotating it 90° anticlockwise otherwise;
 d. $n_i$ denotes the outwards-pointing normal of w-aligned edge $E_i$, defined as:

$$n_i = \frac{m_{i-1} + m_i}{\|m_{i-1} + m_i\|}.$$

Index −1 is treated as being equivalent to the last element of an indexed range, so that $m_{-1} = m_{h-1}$, and so on for other indexed variables. Similarly, for an index ranging from 0 to some number η−1, a value of η is treated as being equivalent to the first element of the range, so that $m_h = m_0$, and so on.

It is assumed that whenever the gripper 3 of the industrial robot 2 approaches a w-aligned edge $E_i$ of some RE prism with the intention of grasping the item contained within the prism, the robot's gripper's 3 origin (i.e. the origin of the robot's gripper's coordinate system) will remain close to the plane that contains $E_i$ and its normal $n_i$, at least until the gripper makes contact with the item. It may be necessary to take into account the amount by which the gripper's origin may deviate from this plane when choosing the parameters that define the region around each w-aligned edge that must be free of obstruction in order for the item selection process to consider that edge's corresponding grasp points to be graspable. These parameters will be defined in due course.

Precluding the Selection of Undesirable Grasp Points

Moreover, the vector determination unit is further arranged to compute which w-aligned edges of each computed right, enclosing prism correspond to grasp points that should be precluded from an item selection process.

In some embodiments, it would be undesirable for the item selection process to treat all w-aligned edges as if the grasp points that they are assumed to contain can be used whenever the edge has sufficient clearance. So, for any given reference RE prism R containing an item that the selection process is considering the possibility of selecting, the embodiment will be explained in terms of a set $G_R$ that contains a w-aligned edge $E_i$ of R if and only if the selection process should consider the possibility of commanding the industrial robot 2 to grab the grasp point closest to $E_i$. Note that $G_R$ is a purely conceptual entity that is used to simplify the description of an embodiment of the invention. While an embodiment may explicitly construct a representation of $G_R$, it is unnecessary for it to do so; an embodiment only needs to be able to iterate over the w-aligned edges that constitute $G_R$. An embodiment in which an industrial robot 2 is free to grab any grasp point that has sufficient clearance can be thought of as an embodiment in which $G_R$ is the trivial set that contains all of R's w-aligned edges.

An example of an embodiment in which $G_R$ is a non-trivial set of w-aligned edges is an embodiment in which an industrial robot 2 is equipped with a vacuum gripper a requirement of which is the need to push an item laterally while attempting to grasp it, to ensure that the gripper forms an airtight seal. In such an embodiment, care must be taken to ensure that the robot does not push the item off the surface that it is stored on.

To ensure that a robot will not push an item off its storage surface, some embodiments make use of the assumption that when pushing an item, the gripper's origin will remain close to the plane that contained the grasp point's corresponding w-aligned edge and that edge's normal before the item was moved (which is to say that the industrial robot 2 will push the item in a direction that is roughly parallel to the initial orientation of the edge's normal). Under this assumption, these embodiments define $G_R$ as the set of w-aligned edges of R whose normals are closest in orientation $\bar{p}-c$, to the vector defined in the uv plane's coordinate system, that defines the position of $$\bar{p} = \frac{1}{h}\sum_{i=0}^{h-1} p_i$$

the centroid of the projections of the R's vertices onto the uv plane relative to the centroid c of the storage surface. More specifically, and with reference to FIG. 3, given an estimate c of the position of the centre of the storage surface in uv coordinates, these embodiments define $G_R$ as:

$$G_R = E_i | \forall n_j (n_i \cdot (\bar{p}-c) \geq n_j \cdot (\bar{p}-c))\}.$$

Figure 3:
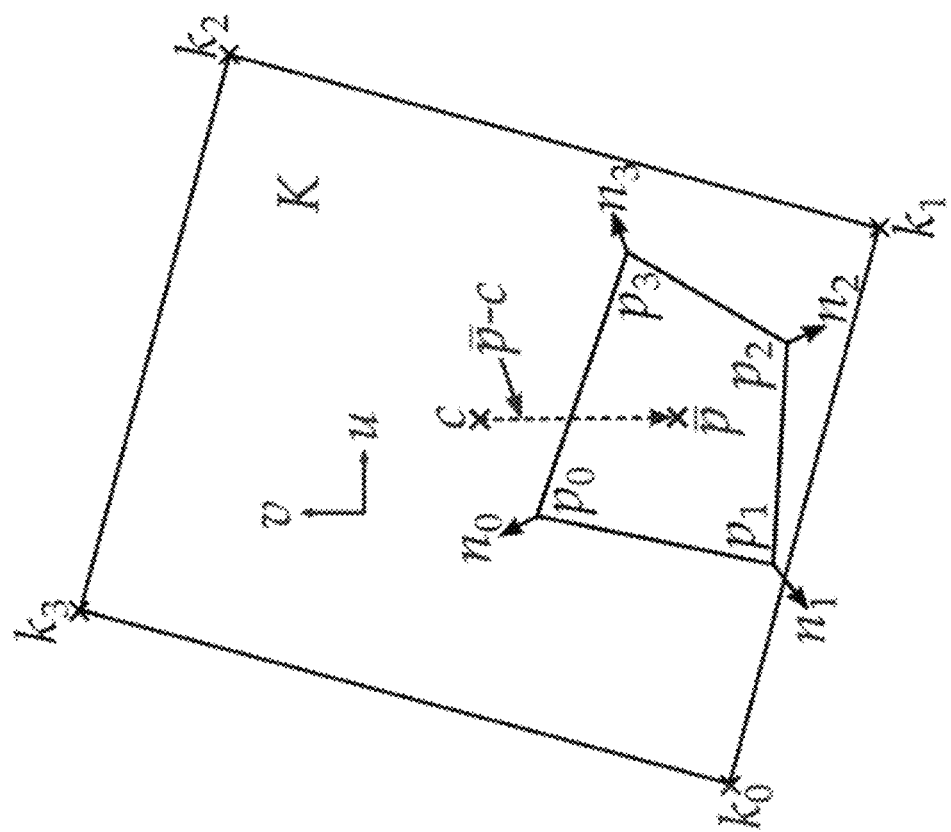
FIG. 3 illustrates the projection of a right, enclosing prism onto the uv plane (which is approximately parallel to the storage surfaces), and a convex prism K, which encloses the projection of the uppermost storage surface onto the uv plane.

In the case illustrated in FIG. 3, $G_R$ would be the singleton set $\{E_2\}$.

An alternative way of defining $G_R$, used by some other embodiments, relies on the embodiment being able to calculate the coordinates $k_0, k_1, \ldots, k_{l-1}$ of the l vertices (sorted in clockwise or anticlockwise order) of a convex, polygonal approximation K of the storage surface's projection onto the uv plane (e.g. by calculating the l=4 vertices of the minimal-area rectangle that encloses the projection of the surface and the items stored on it onto the uv plane, as depicted in FIG. 3), and on there being a known maximum distance d that an item can be pushed. Under this method, an embodiment adds an edge E; to $G_R$ if and only if R's projection onto the uv plane has no edge $p_{j-1}$ $p_j$ such that:

a. K encloses $p_{j-1}$ $p_j$, and translating $p_{j-1}$ $p_j$ d units in direction $-n_i$ will cause it to cross some edge $k_{0-1}k_0$ of K; or
b. at least one endpoint of $p_{j-1}$ $p_j$ lies outside K, and translating it in direction $-n_i$ will move it further from the closest edge of K.

There are many methods described in the computational geometry literature that an embodiment could use to carry out these containment checks. E.g. J. O'Rourke, "Computational Geometry in C", Cambridge University Press, 1998 (incorporated herein by reference) gives solutions to these problems. One simple approach, which exploits K's convexity, is to partition K into l–2 triangles:

$$T_0 = k_0 k_1 k_2, T_1 = k_0 k_2 k_3, \ldots, T_{l-3} = k_0 k_{l-2} k_{l-1},$$

and to count the number of endpoints of $p_{j-1}$ $p_j$ that are contained in any of these triangles, noting that K encloses $p_{j-1}$ $p_j$ if and only if each endpoint is contained in a triangle. Methods for checking whether or not a point lies in a triangle are described in J. O'Rourke's aforementioned book.

Embodiments using this alternative definition of $G_R$ check whether or not translating $p_{j-1}$ $p_j$ d units in direction $-n_i$ will cause it to cross an edge $k_{0-1}$ $k_0$ of K by computing the intersections of: the rays passing through $p_{j-1}$ $p_j$'s endpoints in direction $-n_i$ with $k_{0-1}k_0$; and the rays passing through $k_{0-1}$ $k_0$'s endpoints in direction $n_i$ with $p_{j-1}$ $p_j$. In particular, translating $p_{j-1}$ $p_j$ d units in direction $-n_i$ causes it to cross edge $k_{0-1}k_o$ if and only if the set $$U = \left\{\mu \middle| \begin{array}{c} \mu \geq 0, \quad \exists (\lambda, p, k) \in [0,1] \times \{p_{j-1}, p_j\} \times \{k_{o-1}, k_o\} \\ [(p - \mu n_i = k_{o-1} + \lambda(k_o - k_{o-1})) \vee (k + \mu n_i = p_{j-1} + \lambda(p_j - p_{j-1}))] \end{array}\right\}$$

is non-empty, and min U≤d. The embodiments in question determine whether or not this is so by:

a. iterating over the 4 endpoints of $p_{j-1}$-$p_j$ and $k_{0-1}k_o$;
b. using well-known numerical linear algebra methods to determine whether or not the appropriate 2×2 linear equation given in the definition of U has a solution (or infinitely many solutions) with $\mu \geq 0$ and $\lambda \in [0,1]$, and if so, to calculate the smallest value of $\mu \geq 0$ under which the corresponding value of $\lambda \in [0,1]$;
c. keeping track of the smallest value of $\mu$ calculated so far;
d. concluding that min U≤d as soon as a value of $\mu$ is calculated that is no larger than d, and that the converse is true if no such value of $\mu$ is found.

Given an endpoint p of $p_{j-1}p_j$ that lies outside of K (i.e. an endpoint that does not lie within any of the triangles $T_0, \ldots, T_{l-3}$), embodiments using this alternative definition of $G_R$ check whether or not translating p in direction $-n_i$ will move it further from the closest edge of K by:

a. identifying the closest edge $k_{0-1}k_0$ of K by searching for the $o \in \{0, \ldots, l-1\}$ that minimises:

$$(p - k_{o-1}) \times \frac{k_o - k_{o-1}}{\|k_o - k_{o-1}\|},$$

where × denotes the 2D cross product, defined as $$a \times b \triangleq a_x b_y - a_y b_x;$$

b. concluding that translating p in direction $-n_i$ will move it further from $k_{0-1}$ $k_0$ if and only if there is a negative value u that satisfies the following 2×2 linear equation:

$$p - \mu n_i = k_{o-1} + \lambda(k_o - k_{o-1})$$

for some free variable $\lambda$.

Figure 5:
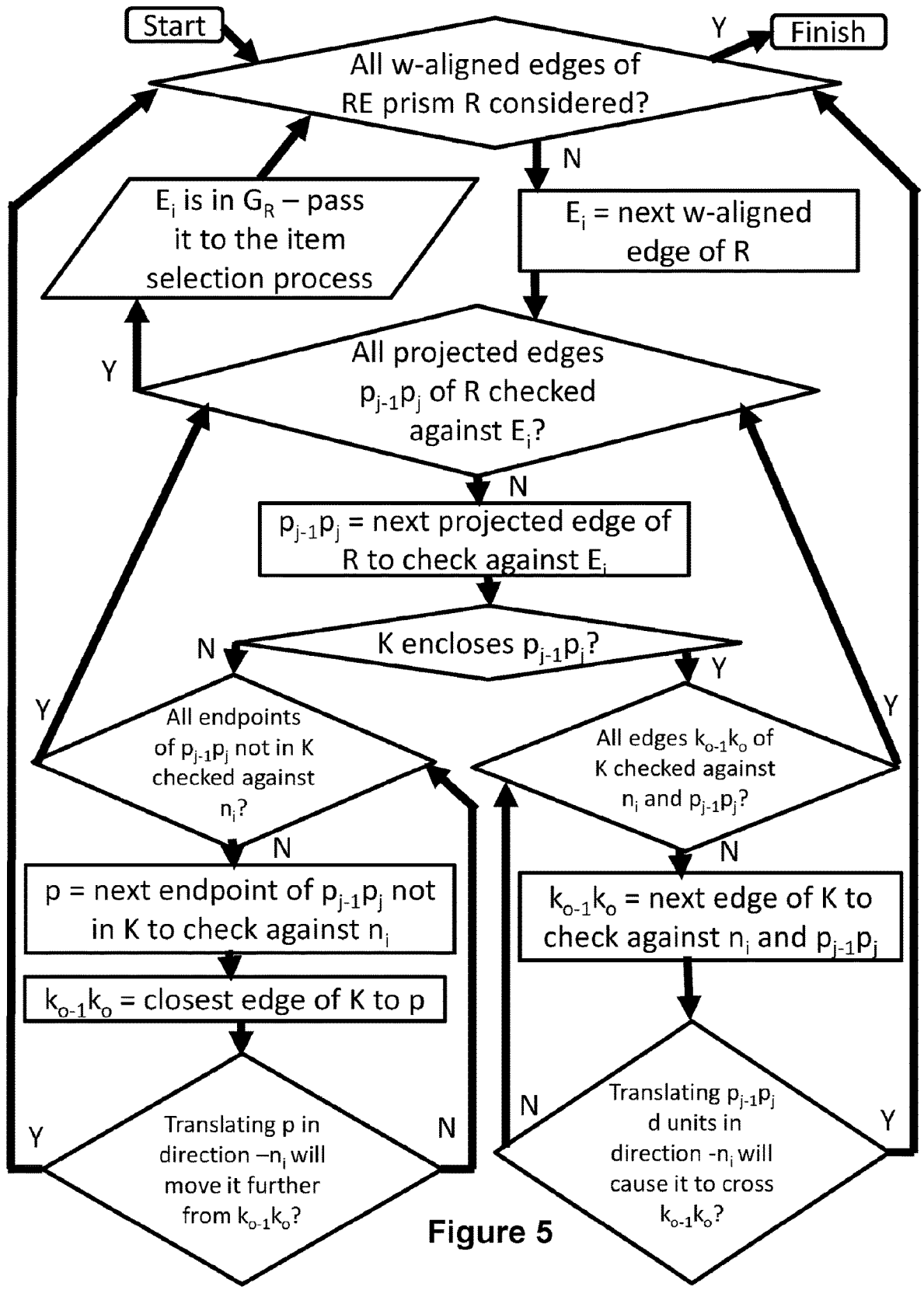
FIG. 5 is a flowchart illustrating the process by which some embodiments rule out the possibility of selecting grasp points that a robot cannot grab without pushing the item off its storage surface.

The process by which an embodiment may identify the w-aligned edges that make up this alternative definition of $G_R$ is summarised in FIG. 5.

Free Space Boundary Construction

The item selection unit is arranged to iterate over the w-aligned edges of each right, enclosing prism, that do not correspond to grasp points that should be precluded from the item selection process, computing a pair of quadrilateral-based, right prisms for each such a w-aligned edge. This is referred to as free space boundary construction.

Figure 4:
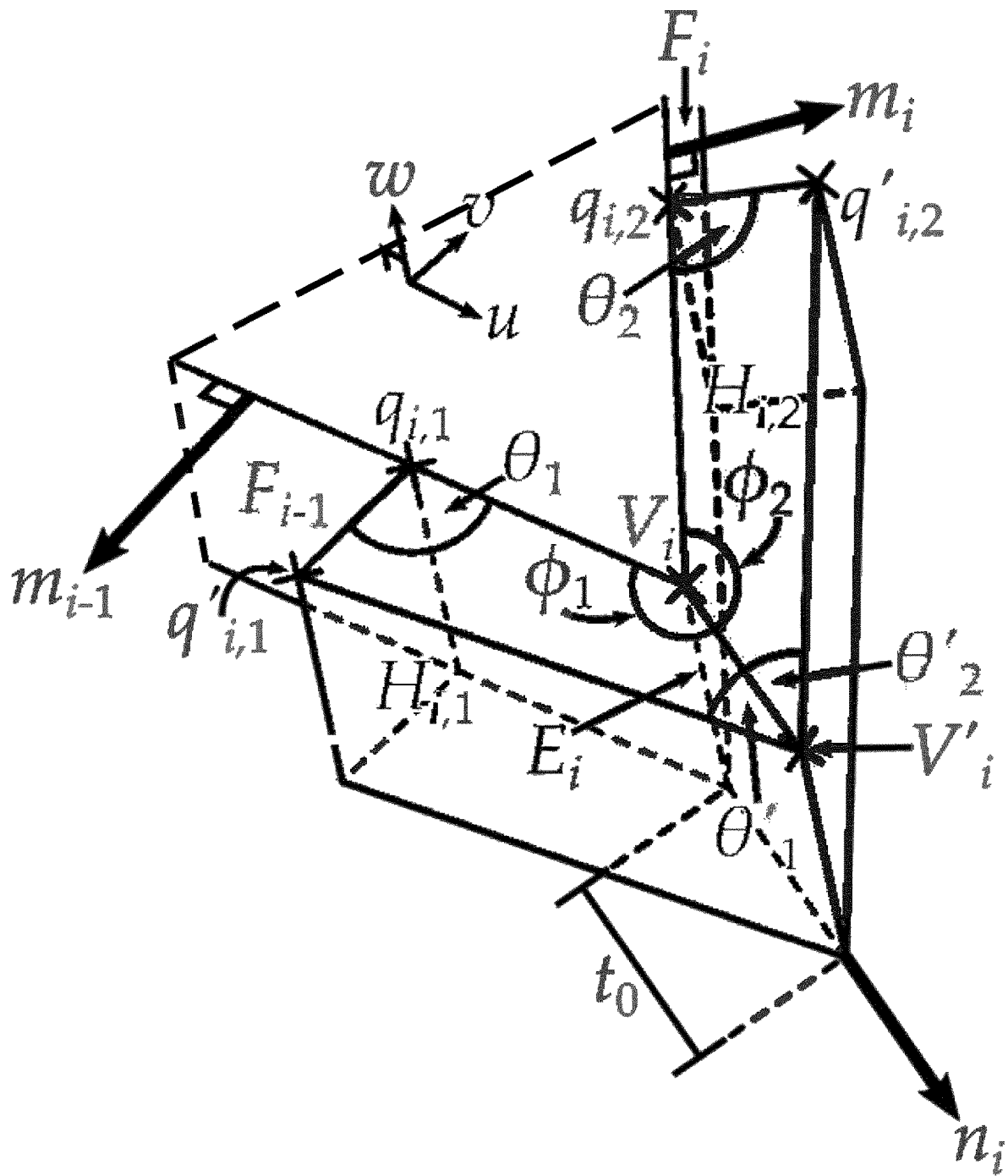
FIG. 4 illustrates two quadrilateral-based right prisms, $H_{i,1}$ and $H_{i,2}$, adjacent to an edge $E_i$ of an item's right, enclosing prism. These quadrilateral-based right prisms are used to establish whether or not each item's grasp points have sufficient clearance to be grasped.

In more detail, once an RE prism has been constructed for each segment, the item selection process must identify an RE prism R that has a w-aligned edge in $G_R$ with sufficient free space around it for a robot to be able to move towards a corresponding grasp point of the enclosed item without colliding with any other items. Given a w-aligned edge $E_i \in G_R$, the item selection process determines whether or not $E_i$ has enough free space by defining two quadrilateral-based, right prisms $H_{i,1}$ and $H_{i,2}$ adjacent to $E_i$'s two neighbouring w-aligned faces $F_{i-1}$ and $F_i$, as illustrated in FIG. 4, and checking whether or not $H_{i,1}$ or $H_{i,2}$ intersect any of the RE prisms (including R if it is concave; if $E_i$ lies in a concavity of R, R itself may obstruct the gripper's path to a corresponding grasp point of $E_i$). The embodiments consider $E_i$ to have sufficient clearance if and only if no RE prism intersects either $H_{i,1}$'s interior or $H_{i,2}$'s interior.

With reference to FIG. 4, $H_{i,1}$ and $H_{i,2}$ are defined by the following seven user-specified parameters:
 a. the distance to of vertex $V'_i$ from vertex $V_i$ of R;
 b. the distance $t_1$ of vertex $q_{i,1}$ of $H_{i,1}$ from vertex $V_i$;
 c. the angle $\theta_1 \in (0, \pi)$ between edges $q_i$, 1 $V_i$ and $q_i$, 1 $q'_{i,1}$ of $H_{i,1}$;
 d. the angle $\theta'_1 \in (0, \pi)$ between edges $V'_i \, q'_{i,1}$ and $V'_i \, V_i$;
 e. the distance $t_2$ of vertex $q_{i,2}$ of $H_{i,2}$ from vertex $V_i$ of R;
 f. the angle $\theta_2 \in (0, \pi)$ between edges $q_{i,2} \, V_i$ and $q_{i,2} \, q'_{i,2}$ of $H_{i,2}$; and
 g. the angle $\theta'_2 \in (0, \pi)$ between edges $V'_i \, q'_{i,2}$ and $V'_i \, V_i$.

Given these parameters, all embodiments define vertices $V'_i$, $q_{i,1}$ and $q_{i,2}$ of the upper bases of $H_{i,1}$ and $H_{i,2}$ as follows:

$$V'_i = V_i + t_0 n_i,$$

$$q_{i,1} = V_i + t_1 \frac{V_{i-1} - V_i}{\|V_{i-1} - V_i\|},$$

$$q_{i,2} = V_i + t_2 \frac{V_{i+1} - V_i}{\|V_{i+1} - V_i\|}.$$

Some embodiments then compute vertex $q'_{i,1}$ by:
 a. projecting $q_{i,1}$, $V_i$ and $V'_i$ onto the uv plane, giving 2D points $\hat{q}_{i,1}$, $\hat{V}_i$ and $\hat{V}'_i$ respectively;
 b. rotating $\hat{V}_i$ about $\hat{q}_{i,1}$ by angle $\theta_1$, through the halfspace of edge $\hat{q}_{i,1} \, \hat{V}_i$ that contains $\hat{V}'_i$ giving a new point $\hat{V}''$;
 c. rotating $\hat{V}_i$ about $\hat{V}'_i$ by angle $\theta'_1$, through the halfspace of edge $\hat{V}'_i \hat{V}_i$ that contains $\hat{q}_{i,1}$, giving a new point $\hat{V}'''$;
 d. calculating the intersection $\hat{q}'_{i,1}$ of the line that contains $\hat{q}_{i,1}$ and $\hat{V}''_i$ with the line that contains $\hat{V}'_i$ and $\hat{V}'''_i$;
 e. mapping $\hat{q}'_{i,1}$ back to the corresponding 3D Point $\hat{q}_{i,1}$.

These embodiments calculate vertex $q'_{1,2}$ by an analogous process. The precise computations are given by the following equations:

$$q'_{i,1} = V_i + M\Psi(M^T(q_{i,1}-V_i), \theta_1, M^T(V'_i-V_i), \theta'_1),$$

$$q'_{i,2} = V_i + M\Psi(M^T(q_{i,2}-V_i), \theta_2, M^T(V'_i-V_i), \theta'_2),$$

where $$M = (u \ v),$$

$$\Psi(a, \theta_a, b, \theta_b) = a + \frac{v_b \times (b-a)}{v_b \times v_a} v_a,$$

$$v_a = -\begin{pmatrix} \cos\theta_a & \kappa_{a,b}\sin\theta_a \\ -\kappa_{a,b}\sin\theta_a & \cos\theta_a \end{pmatrix} a,$$

$$v_b = -\begin{pmatrix} \cos\theta_b & -\kappa_{a,b}\sin\theta_b \\ \kappa_{a,b}\sin\theta_b & \cos\theta_b \end{pmatrix} b,$$

$$\kappa_{a,b} = \text{sign}(a \times b).$$

Some embodiments compute W by evaluating the following equivalent equation:

$$\Psi(a, \theta_a, b, \theta_b) = b + \frac{v_b \times (b-a)}{v_b \times v_a} v_b.$$

These computations produce valid upper bases of $H_{i,1}$ and $H_{i,2}$ if and only if there are non-negative numbers $\alpha_1$, $\beta_1$, $\alpha_2$ and $\beta_2$ such that:

$$q'_{i,1} = V_i + \alpha_1(q_{i,1}-V_i) + \beta_1(V'_i-V_i)$$

and $$q'_{i,2} = V_i + \alpha_2(q_{i,2}-V_i) + \beta_2(V'_i-V_i).$$

This is equivalent to imposing the following constraints on the user-specified parameters:

a. $\theta_a + \theta_b + \phi \in ]0, 2\pi[\setminus\{\pi\}$, and b. $(\theta_a, \theta_b) \in ((]0, \tau_a] \times ]0, \tau_b]) \cup ([\tau_a, \pi[ \times [\tau_b, \pi[)) \setminus \{(\tau_a, \tau_b)\}$, where
 $\tau_a = \text{atan2}(\|b\| \sin \phi, \|a\|-\|b\| \cos\phi)$,
 $\tau_b = \text{atan2}(\|a\| \sin \phi, \|b\|-\|a\| \cos \phi)$, and
 $\phi = \text{atan2}(|a \times b|, a \cdot b)$ corresponds to angle $\phi_1$ in FIG. 4 in the calculation of $q'_{i,1}$, and to angle $\phi_2$ in the calculation of $q'_{i,2}$.

Note that in the case of $\hat{q}_{i,1}$, for example, $\|a\|=t_1$, $\|b'\|=t_0$, $\theta_a=\theta_1$ and $\theta_b=\theta'_1$. An additional necessary constraint is that $a \times b \neq 0$, which is always true by definition of $n_i$ (which is parallel to b).

Given the vertices of the upper bases of $H_{i,1}$ and $H_{i,2}$, all embodiments make use of the fact that these prisms are right prisms in their calculation of the vertices of the lower bases. Some embodiments calculate these vertices by adding $V_{i+h} - V_i$ to the adjacent vertices of the upper bases.

$H_{i,1}$ and $H_{i,2}$ should enclose the space that the gripper will need to move through when approaching a grasp point corresponding to w-aligned edge $E_i$ of R. Thus, the values chosen for the user-specified parameters depend on: the shape of the gripper; the expected error between the uv coordinates of $E_i$ and the uv coordinates of the enclosed item's corresponding grasp point(s); and the trajectory that the gripper must follow through the region in-between the planes that contain the bases of $H_{i,1}$ and $H_{i,2}$, in order to reach $E_i$'s corresponding grasp point(s).

RE Prism Intersection

The item selection unit is further arranged to check whether or not the interior of either of the two quadrilateral-based, right prisms associated with a w-aligned edge intersects any of the right, enclosing prisms.

Once an embodiment has constructed $H_{i,1}$ and $H_{i,2}$, it must then check whether or not their interiors intersect any of the RE prisms. An embodiment could do this by using or adapting one of the polyhedron intersection algorithms that have been published in the computational geometry literature. A more efficient solution, used by some embodiments in which the RE prisms all have the same minimal and maximal projections onto the w axis, reduces the problem to that of checking for intersections between triangles by exploiting the fact that the prisms under consideration are all right prisms. For $H_{i,1}$, for example, and an RE prism S, these embodiments project the bases of $H_{i,1}$ and S onto the uv plane, triangulate them, and then check whether or not one of the triangles of S's projected, triangulated base intersects the interior of one of the triangles of $H_{i,1}$'s projected, triangulated base. Such an intersection will be found if an only if S intersects $H_{i,1}$'s interior.

Algorithms for carrying out these triangle-triangle intersection tests are well known within the computer graphics and computational geometry communities. One such algorithm is described in Tomas Möller, "A Fast Triangle-Triangle Intersection Test", in Journal of Graphics Tools, 1997 which is incorporated herein by reference.

Some embodiments, in which the RE prisms do not all have the same minimal and maximal projections onto the w axis, use a similar method to determine whether or not any RE prisms intersect the interiors of $H_{i,1}$ and $H_{i,2}$. For $H_{i,1}$, for example, these embodiments first of all check whether:

a. the minimal projection of S's vertices onto the w axis is greater than the maximal projection of $H_{i,1}$'s vertices onto the w axis; or b. the maximal projection of S's vertices onto the w axis is less than the minimal projection of $H_{i,1}$'s vertices onto the w axis.

If either of these conditions holds, these embodiments conclude that $H_{i,1}$'s interior cannot possibly intersect S. Otherwise, they use the aforementioned triangle-triangle intersection tests to determine whether or not $H_{i,1}$'s interior intersects S.

Item Selection and Retrieval

Figure 6:
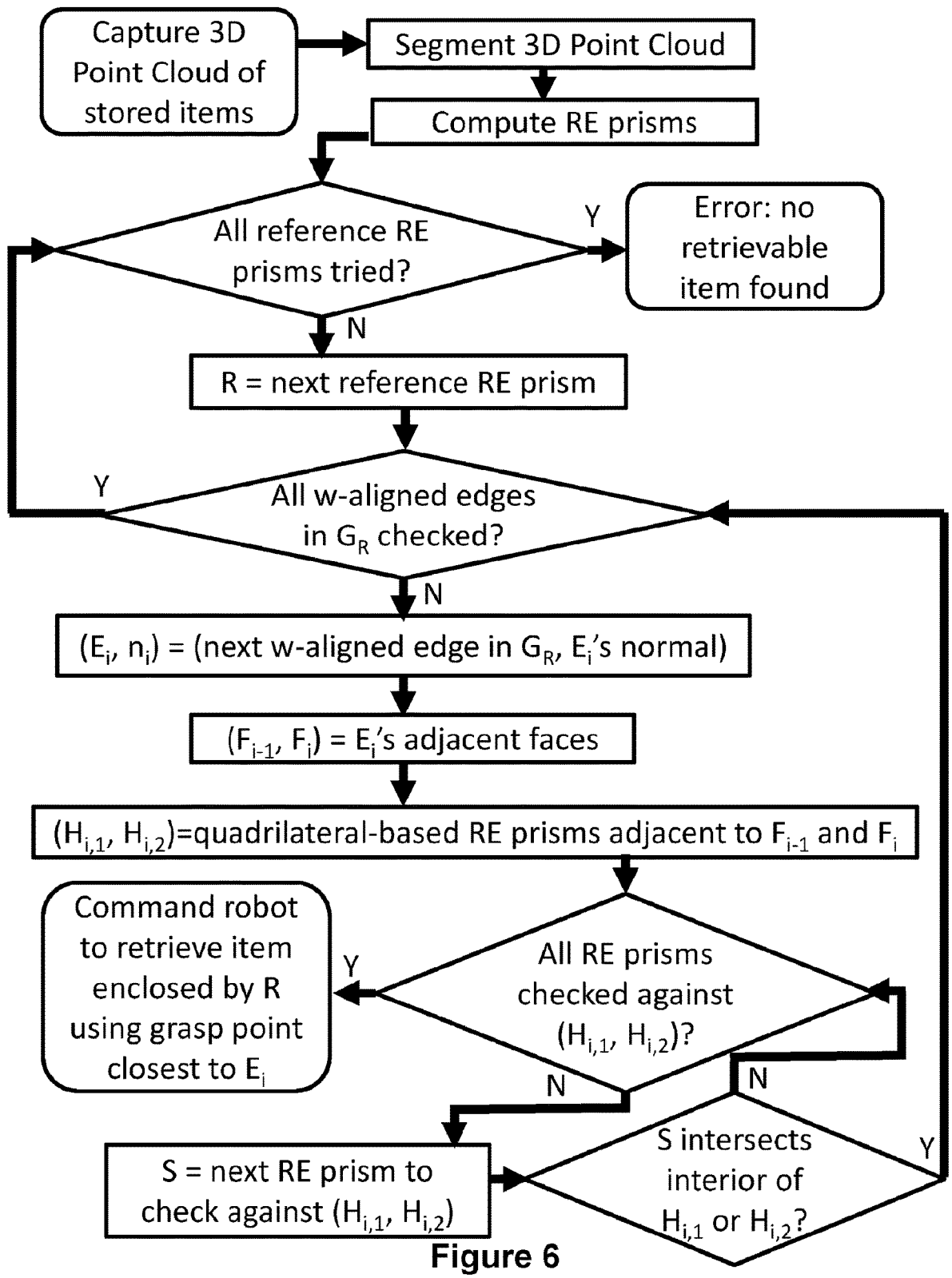
FIG. 6 is a flowchart illustrating the sequence of steps executed by an embodiment of the invention in which a robot is commanded to retrieve the first item that is found to have sufficient clearance around one of its grasp points.

By way of the above described approach, the choice of which item to select for retrieval is restricted to those items with a corresponding RE prism R such that there is a w-aligned edge $G_R$ that is found to have sufficient free space around it, as established by the intersection test described in the previous subsection. The embodiment illustrated in FIG. 6 chooses the item corresponding to the first RE prism that is found to have sufficient clearance, but an embodiment may use any such RE prism.

On selecting an item with sufficient clearance, all embodiments of the invention make a note of the uv coordinates of a w-aligned edge of the item's RE prism that was found to have sufficient free space, so that the Retrieval Controller 1 can later locate one of the item's corresponding grasp points and command the industrial robot 2 to retrieve it.

This functionality is achieved by the robot instructing unit which is arranged to instruct the robot to retrieve the item based on uv coordinates of one or more w-aligned edges whose associated quadrilateral-based, right prisms do not have interiors that intersect any of the right, enclosing prisms as selected by the item selection unit.

In this way, accurate and repeatable selection and retrieval of an item from the stacked surfaces 5 is achieved.

It is envisaged that a method relating to the above described steps of the Retrieval Controller 1 is within the scope of the present embodiment of the present invention.

Modifications and Variations

This application claims priority from UK Patent Application No. GB2012459.0 filed 11 Aug. 2020, the content of all this application hereby being incorporated by reference.

Many modifications and variations can be made to the embodiments described above, without departing from the scope of the present invention.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of bins or containers are arranged within a framework structure. The bins or containers are accessed by load handling devices operative on tracks located on the top of the frame structure. The load handling devices lift bins or containers out from the stacks, multiple load handling devices co-operating to access bins or containers located in the lowest positions of the stack. A system of this type is illustrated schematically in FIGS. 1 to 4 of the accompanying drawings.

Figure 7:
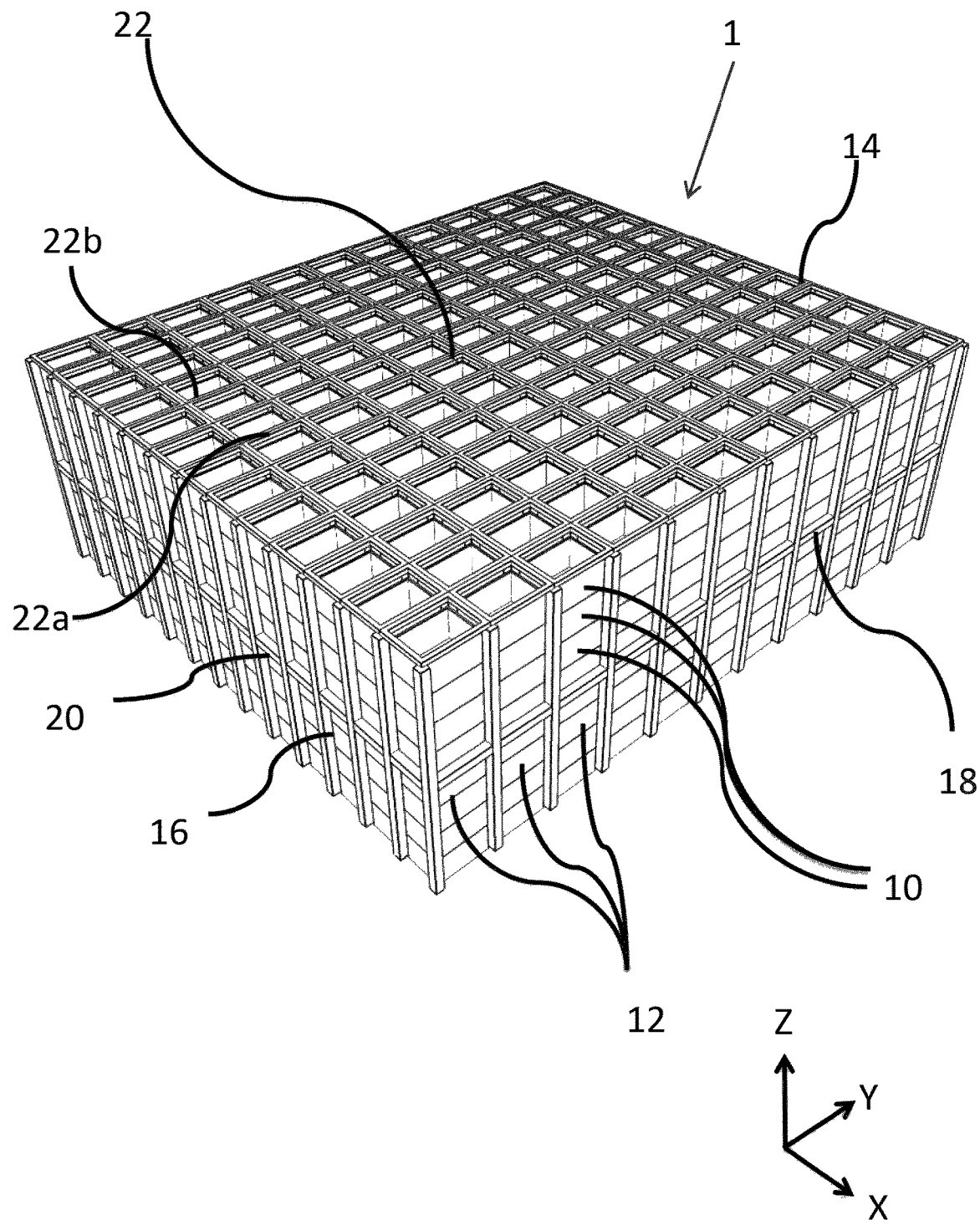
FIG. 7 is a schematic diagram of a framework structure according to a known system.
Figure 8:
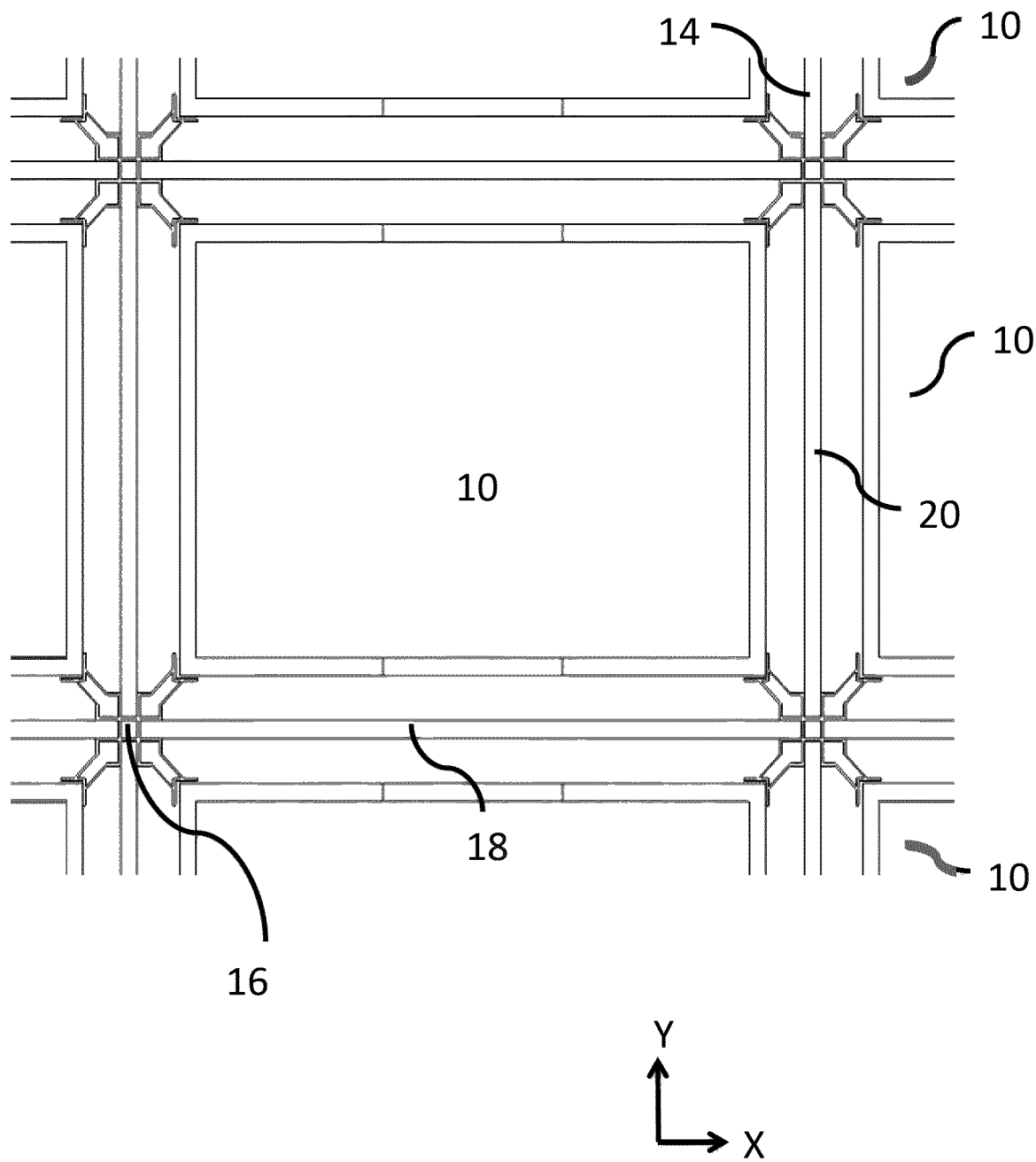
FIG. 8 is a schematic diagram of a top-down view showing a stack of bins arranged within the framework structure of FIG. 7.

As shown in FIGS. 7 and 8, stackable containers, known as bins 10, are stacked on top of one another to form stacks 12. The stacks 12 are arranged in a grid framework structure 14 in a warehousing or manufacturing environment. FIG. 7 is a schematic perspective view of the framework structure 14, and FIG. 8 is a top-down view showing a stack 12 of bins 10 arranged within the framework structure 14. Each bin 10 typically holds a plurality of product items (not shown), and the product items within a bin 10 may be identical, or may be of different product types depending on the application.

The framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the framework structure 14, so that the framework structure 14 guards against horizontal movement of the stacks 12 of bins 10, and guides vertical movement of the bins 10.

Figure 9:
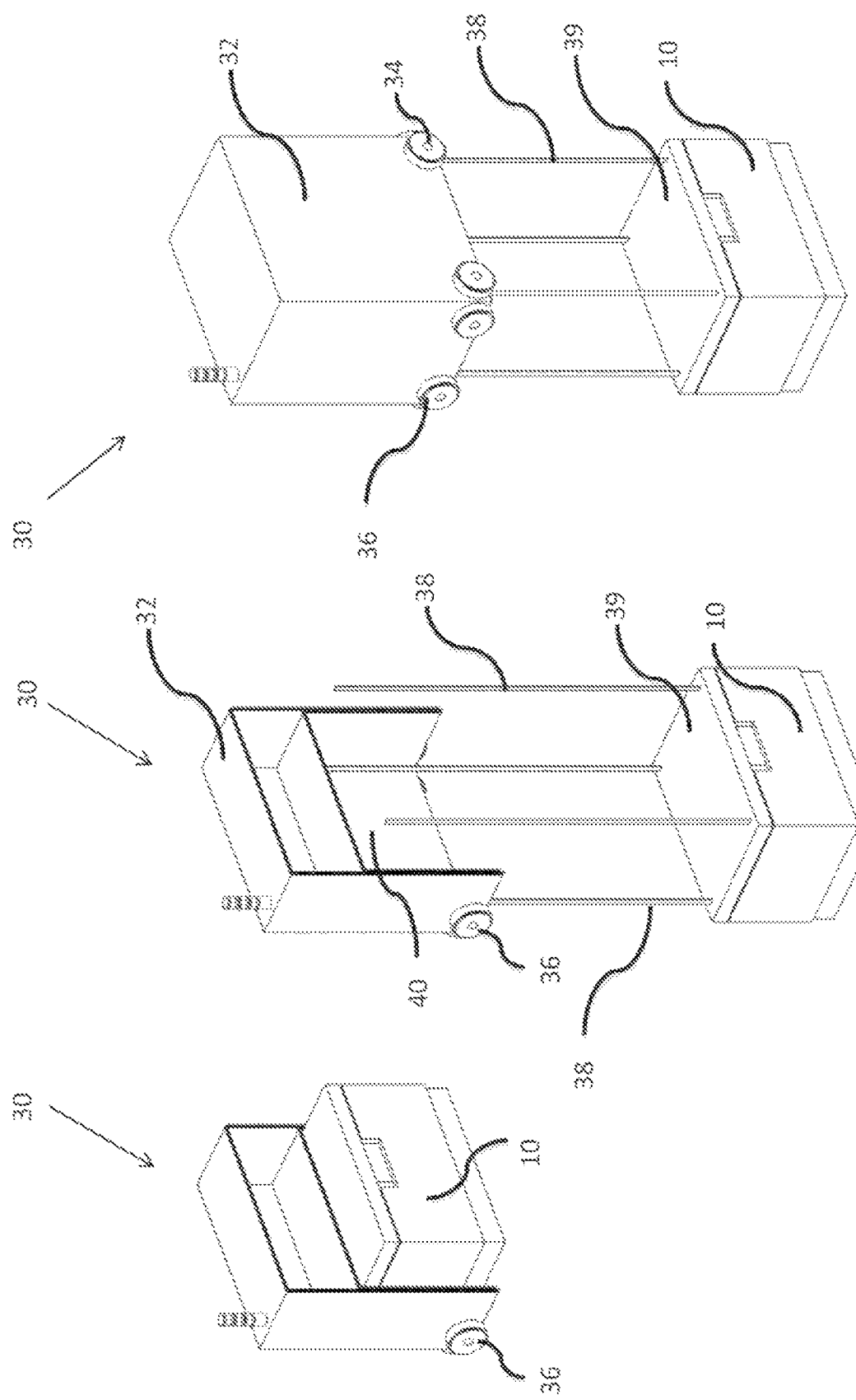
FIGS. 9(a) and 9(b) are schematic perspective views of a load handling device depositing a bin and FIG. 9(c) is a schematic front perspective view of a load handling device lifting a bin.
Figure 10:
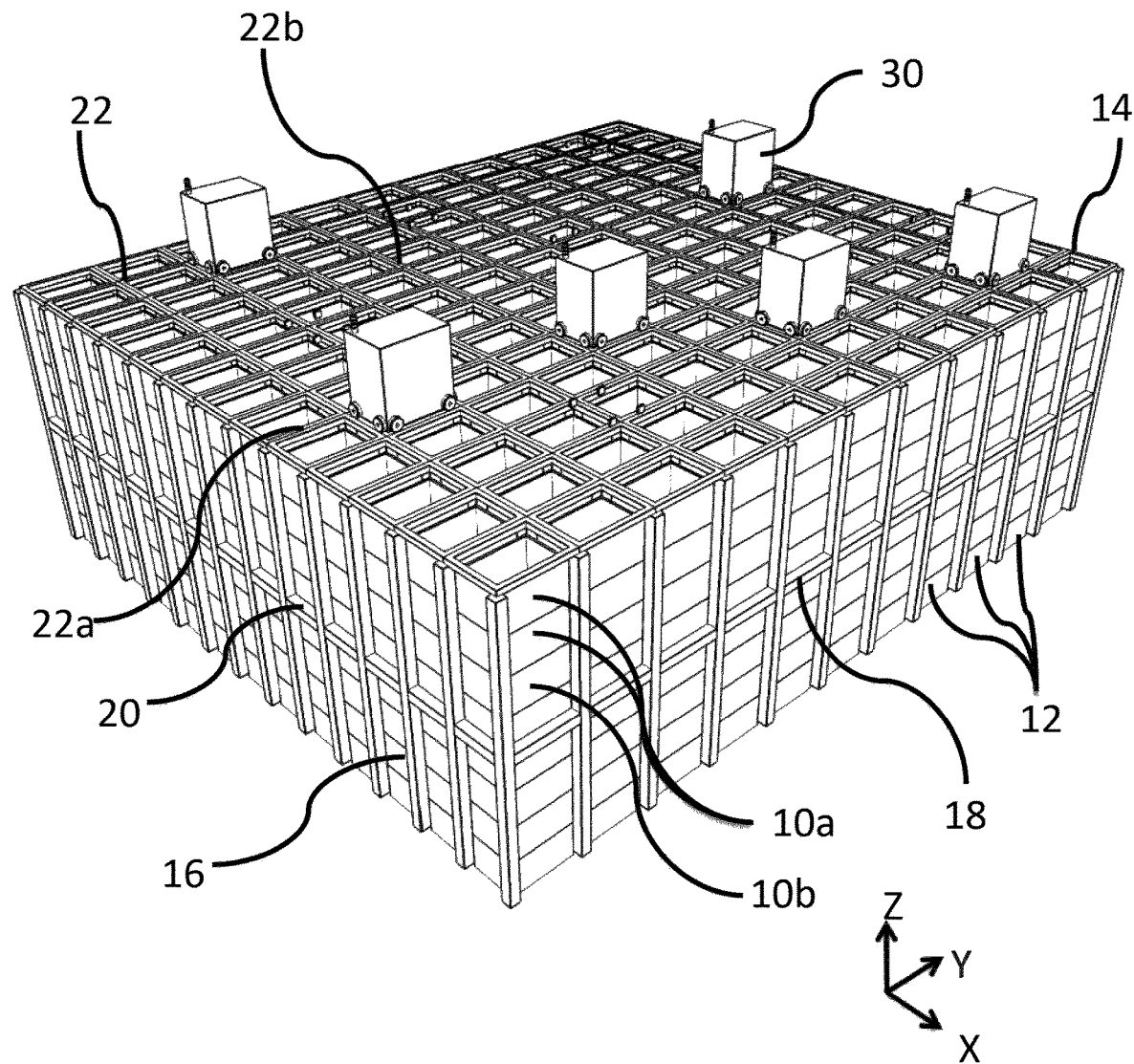
FIG. 10 is a schematic diagram of a system showing load handling devices operating on the framework structure.

The top level of the frame structure 14 includes rails 22 arranged in a grid pattern across the top of the stacks 12. Referring additionally to FIGS. 9 and 10, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

One form of load handling device 30 is further described in Norwegian U.S. Pat. No. 317,366, the contents of which are incorporated herein by reference. FIGS. 9(a) and 9(b) are schematic cross sectionals views of a load handling device 30 depositing a bin 10, and FIG. 9(c) is a schematic front perspective view of a load handling device 30 lifting a bin 10. However, there are other forms of load handling device that may be used in combination with the system herein described. For example a further form of robotic load handling device is described in PCT Patent Publication No. WO2015/019055, hereby incorporated by reference, (Ocado) where each robotic load handler only covers one grid space of the frame work structure, thus allowing higher density of load handlers and thus higher throughput for a given sized system.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a lifting device. The lifting device 40 comprises a gripper plate 39 is suspended from the body of the load handling device 32 by four cables 38. The cables 38 are connected to a winding mechanism (not shown) housed within the vehicle 32. The cables 38 can be spooled in or out from the load handling device 32, so that the position of the gripper plate 39 with respect to the vehicle 32 can be adjusted in the Z direction.

The gripper plate 39 is adapted to engage with the top of a bin 10. For example, the gripper plate 39 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 39, which is powered and controlled by signals carried through the cables 38 themselves or through a separate control cable (not shown).

To remove a bin 10 from the top of a stack 12, the load handling device 30 is moved as necessary in the X and Y directions so that the gripper plate 39 is positioned above the stack 12. The gripper plate 39 is then lowered vertically in the Z direction to engage with the bin 10 on the top of the stack 12, as shown in FIG. 9(c). The gripper plate 39 grips the bin 10, and is then pulled upwards on the cables 38, with the bin 10 attached. At the top of its vertical travel, the bin 10 is accommodated within the vehicle body 32 and is held above the level of the rails 22. In this way, the load handling device 30 can be moved to a different position in the X-Y plane, carrying the bin 10 along with it, to transport the bin 10 to another location. The cables 38 are long enough to allow the load handling device 30 to retrieve and place bins from any level of a stack 12, including the floor level. The weight of the vehicle 32 may be comprised in part of batteries that are used to power the drive mechanism for the wheels 34, 36.

As shown in FIG. 10, a plurality of identical load handling devices 30 are provided, so that each load handling device 30 can operate simultaneously to increase the throughput of the system. The system illustrated in FIG. 10 may include specific locations, known as ports, at which bins 10 can be transferred into or out of the system. An additional conveyor system (not shown) is associated with each port, so that bins 10 transported to a port by a load handling device 30 can be transferred to another location by the conveyor system, for example to a picking station (not shown). Similarly, bins 10 can be moved by the conveyor system to a port from an external location, for example to a bin-filling station (not shown), and transported to a stack 12 by the load handling devices 30 to replenish the stock in the system.

Each load handling device 30 can lift and move one bin 10 at a time. If it is necessary to retrieve a bin 10b ("target bin") that is not located on the top of a stack 12, then the overlying bins 10a ("non-target bins") must first be moved to allow access to the target bin 10b. This is achieved in an operation referred to hereafter as "digging".

Referring to FIG. 10, during a digging operation, one of the load handling devices 30 sequentially lifts each non-target bin 10a from the stack 12 containing the target bin 10b and places it in a vacant position within another stack 12. The target bin 10b can then be accessed by the load handling device 30 and moved to a port for further transportation.

Each of the load handling devices 30 is under the control of a central computer. Each individual bin 10 in the system is tracked, so that the appropriate bins 10 can be retrieved, transported and replaced as necessary. For example, during a digging operation, the locations of each of the non-target bins 10a is logged, so that the non-target bins 10a can be tracked.

The system described with reference to FIGS. 7 to 10 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

However, there are some drawbacks with such a system, which all result from the above-described digging operation that must be performed when a target bin 10b is not at the top of a stack 12.

The picking station mentioned previously may be arranged adjacent to the framework structure and arranged to receive a bin 10 from the transporting device 30 for the removal of products from the bin 10 and/or the addition of products to the bin 10 by an operative. In this regard, the operative is envisaged to comprise the industrial robot 2 and retrieval controller 1. In this regard, the use of the retrieval controller 1 and industrial robot 2 may be used to automate the tasks performed at a picking station which may otherwise be performed by a human.

For example, the picking station may comprise the items stored in plurality of stacked surfaces 5. Items may be picked from the stacked surfaces 5 by way of the industrial robot 2 as controlled by the retrieval controller 1. In this way, the automated picking of items for placement in the bin 10 at the picking station may be achieved.

With respect to computer-implemented embodiments, the description provided may describe how one would modify a computer to implement the system or steps of a method. The specific problem being solved may be in the context of a computer-related problem, and the system may not be meant to be performed solely through manual means or as a series of manual steps. Computer-related implementation and/or solutions may be advantageous in the context of some embodiments; at least for the reasons of providing scalability (the use of a single platform/system to manage a large number of inputs and/or activities); the ability to pull together quickly and effectively information from disparate networks; improved decision support and/or analytics that would otherwise be unfeasible; the ability to integrate with external systems whose only connection points are computer-implemented interfaces; the ability to achieve cost savings through automation; the ability to dynamically respond and consider updates in various contexts (such as quickly changing order flow or logistical conditions); the ability to apply complex logical rules that would be infeasible through manual means; the ability for orders to be truly anonymous; among others.

Using electronic and/or computerised means can provide a platform that may be more convenient, scalable, efficient, accurate, and/or reliable than traditional, non-computerised means. Further, systems may be computerised and the platform may advantageously be designed for interoperability, and manual operation may be difficult and/or impossible. Further, manual operation, even if feasible, is unlikely to achieve comparable efficiency.

Scalability may be useful as it may be advantageous to provide a system that may be able to effectively manage a large number of inputs, outputs and/or interconnections and/or integration with external systems.

The convenience and effectiveness of a solution may be valuable in the context of order fulfilment as individuals may have more information available to make better ordering and/or fulfilment decisions.

Figure 11:
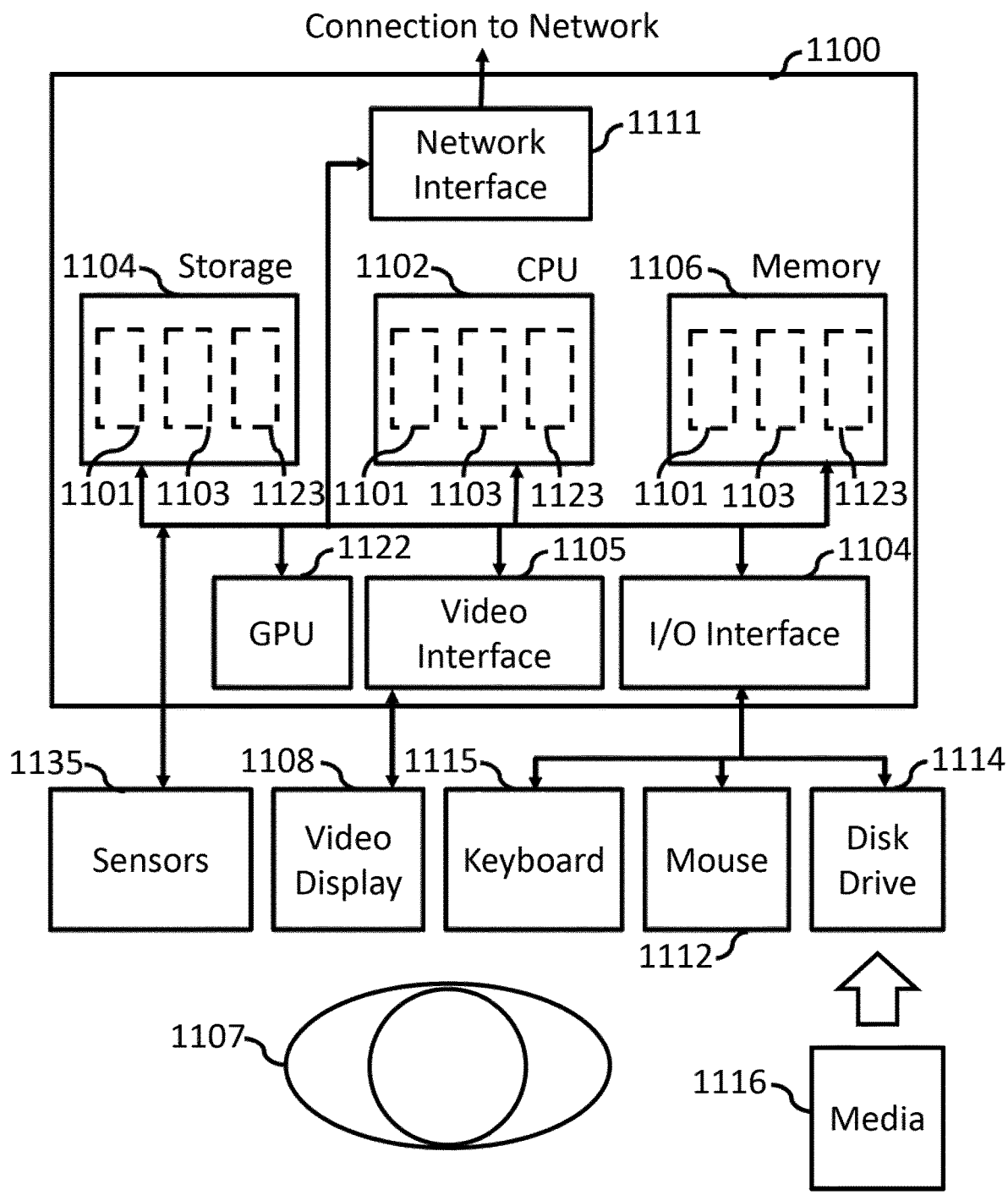
FIG. 11 is an illustrative diagram providing a generic computer hardware and software implementation of certain aspects, as detailed in the description.

The present system and method may be practiced in various embodiments. In particular, the retrieval controller 1 may be envisaged as a suitably configured computer device, and associated communications networks, devices, software and firmware may provide a platform for enabling one or more embodiments as described above. By way of example, FIG. 11 shows a computer device 1100 that may include a central processing unit ("CPU") 1102 connected to a storage unit 1114 and to a random access memory 1106. The CPU 1102 may process an operating system 1101, application program 1103, and data 1123. The operating system 1101, application program 1103, and data 1123 may be stored in storage unit 1114 and loaded into memory 1106, as may be required. Computer device 1100 may further include a graphics processing unit (GPU) 1122 which is operatively connected to CPU 1102 and to memory 1106 to offload intensive image processing calculations from CPU 1102 and run these calculations in parallel with CPU 1102. An operator 1107 may interact with the computer device 1100 using a video display 1108 connected by a video interface 1105, and various input/output devices such as a keyboard 1115, mouse 1112, and disk drive or solid state drive 1114 connected by an I/O interface 1104. In known manner, the mouse 1112 may be configured to control movement of a cursor in the video display 1108, and to operate various graphical user interface (GUI) controls appearing in the video display 1108 with a mouse button. The disk drive or solid state drive 1114 may be configured to accept computer readable media 1116. The computer device 1100 may form part of a network via a network interface 1111, allowing the computer device 1100 to communicate with other suitably configured data processing systems (not shown). One or more different types of sensors 1135 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The mobile application of the present invention may be implemented as a web service, where the mobile device includes a link for accessing the web service, rather than a native application.

The functionality described may be implemented to any mobile platform, including the Android platform, iOS platform, Linux platform or Windows platform.

In further aspects, the disclosure provides systems, devices, methods, and computer programming products, including non-transient machine-readable instruction sets, for use in implementing such methods and enabling the functionality described previously.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

Definitions

Digital Image-any digital encapsulation of a collection of numbers or a collection of lists of numbers that associates each number or list in the collection with a distinct, finite-dimensional index.

Depth—the length of the straight line segment joining a point to a reference point, after projecting the line segment onto a linear reference axis that intersects the reference point.

Depth Map-a Digital Image encapsulating a collection of numbers representing the Depths-measured or defined relative to a common reference point and reference axis—of a set of points. 3D Point-a list containing at least three numbers denoting the position of a point in three-dimensional space.

3D Point Cloud-a Digital Image encapsulating a collection of 3D Points.

Image Grabber-any device, or collection of devices communicating over a network, that is capable of acquiring Digital Images from at least one source that may be:
  a. built into the device or built into at least one device in the collection;
  b. directly connected to the device or directly connected to at least one device in the collection; or
  c. built into or connected to an external device that can communicate with the Image Grabber over a network.

Image Analyser—an Image Grabber that is capable of inferring information about the state of the environment by processing the acquired Digital Images.

Retrieval Controller—an Image Analyser that is capable of issuing motion commands to one or more robots (possibly in response to information extracted from the Digital Images).

Examples include, but are not limited to: a laptop and robot controller connected to each other over a network, with image analysis software and a time-of-flight camera driver installed on the laptop (so that it can acquire Digital Images from an attached time-of-flight camera); two robot controllers connected to a cluster of desktop computers over a network, with distributed image analysis software installed on the computer cluster, and a laser scanner driver installed on one computer in the cluster; an industrial smart camera with image analysis software installed on it, that is connected to a robot controller over a network; a robot controller with image analysis software and an RGB camera driver installed on it.

Depth Sensor—a device or collection of devices operating together that observe their surroundings and transmit a sequence of Digital Images or a sequence of collections of Digital Images to an Image Grabber (which the Depth Sensor may, but need not, be built into), such that all of the following conditions hold:
  a. each transmitted Digital Image or Digital Image collection encodes the observations;
  b. each transmitted Digital Image or Digital Image collection either:
    i. is a Depth Map or is a collection of Depth Maps; or
    ii. can be transformed into a Depth Map or a collection of Depth Maps by an Image Analyser;
  c. each resulting Depth Map represents estimates of the Depths of a set of points observed by the device or by the collection of devices.

Examples include, but are not limited to: time-of-flight cameras; laser scanners; structured-light-based depth-sensing cameras; sonar rangefinders; a plurality of infrared cameras that have been intrinsically and extrinsically calibrated, so that the three-dimensional position of any point in the environment that is visible to at least two of the cameras can be calculated in some coordinate system.

The invention claimed is:

1. A retrieval controller for identifying an item to be retrieved from a flat storage surface by a robot, the retrieval controller comprising:
   a depth map computing unit configured to: establish a global coordinate system, establish an orthonormal set of basis vectors u, v and w defined in the global coordinate system where w is selected to be approximately orthogonal to a surface on which items will be stored, receive a depth map from a depth sensor, convert the received depth map into a 3D Point Cloud defined in the global coordinate system, compute a representation of a partitioning into segments of 3D Points of a 3D Point Cloud such that a segment contains a pair of 3D Points only if the 3D points are to be considered to be part of the surface of a same item;
   a prism calculating unit configured to compute a right, enclosing prism for each segment;
   a vector determination unit configured to compute each of:
     a. an outwards-pointing normal of each w-aligned face of each computed right enclosing prism, and
     b. an outwards-pointing normal of each w-aligned edge of each computed right, enclosing prism,
     c. wherein w-aligned edges of each computed right, enclosing prism correspond to grasp points that will be precluded from an item selection process;
   an item selection unit configured to: iterate over the w-aligned edges of each right enclosing prism that do not correspond to grasp points that are precluded from the item selection process, compute a pair of quadrilateral-based right prisms for each such w-aligned edge, and check whether or not an interior of either of the two quadrilateral-based right prisms associated with a w-aligned edge intersects any of the right enclosing prisms; and
   a robot instructing unit configured to instruct the robot to retrieve an item based on uv coordinates of one or more w-aligned edges whose associated quadrilateral-based right prisms do not have interiors that intersect any of the right enclosing prisms selected by the item selection unit.

2. The retrieval controller according to claim 1, wherein a base of each right enclosing prism is a simple polygon that is orthogonal to w.

3. The retrieval controller according to claim 1, wherein each right enclosing prism contains all of the 3D Points that constitute its associated segment.

4. The retrieval controller according to claim 1, wherein each right enclosing prism has minimal volume.

5. The retrieval controller according to claim 1, wherein the pair of quadrilateral-based right prisms associated with any given w-aligned edge are adjacent to that edge's two neighbouring w-aligned faces.

6. The retrieval controller according to claim 1, wherein bases of each quadrilateral-based right prism associated with any given w-aligned edge are parallel to a uv plane.

7. The retrieval controller according to claim 1, wherein each quadrilateral-based right prism associated with any given w-aligned edge has four edges that are parallel to that w-aligned edge and wherein one of these four edges lies in a plane containing that w-aligned edge and that w-aligned edge's normal.

8. The retrieval controller according to claim 1, wherein for each quadrilateral-based, right prism associated with any given w-aligned edge, associated minimal and maximal projections of quadrilateral-based right prism vertices onto the w axis are equal to minimal and maximal projections of the w-aligned edge onto the w axis.

9. The retrieval controller according to claim 1, wherein the vector determination unit is configured to identify which w-aligned edges of a computed right enclosing prism correspond to grasp points that should be precluded from an item selection process, the vector determination unit being configured to:
   a. compute uv coordinates of a first centroid of a flat storage surface;
   b. compute a second centroid of the uv coordinates of the right enclosing prism's vertices; and
   c. identify the one or more w-aligned edges whose normals are closest in orientation to a vector that runs from the first centroid to the second centroid.

10. The retrieval controller according to claim 1, wherein the vector determination unit is configured to identify which w-aligned edges of a computed right enclosing prism correspond to grasp points that should be precluded from the item selection process, the vector determination unit being configured to:
   a. compute a minimal area convex polygon K that encloses a storage surface's projection onto the uv plane;
   b. compute uv coordinates of vertices of the right, enclosing prism;

c. exclude a given w-aligned edge's grasp points from the item selection process only if one of the following conditions holds:
  i. the minimal area convex polygon K encloses a projected edge of the right enclosing prism, and translating that projected edge a predetermined distance in an opposite direction of the w-aligned edge's normal would cause the projected edge to cross an edge of the minimal area convex polygon K; or
  ii. part of a projected edge of the right, enclosing prism lies outside the minimal area convex polygon K, and translating that projected edge a user-specified distance in the opposite direction of the w-aligned edge's normal would move the projected edge further from a closest edge of the minimal area convex polygon K.

11. A grasping system in combination with the retrieval controller of claim 1, the system comprising:
  a depth sensor for generating a depth map of an item stored on one or more stacked surfaces;
  a robot for grasping the item; and
  the retrieval controller, configured to control the robot to grasp the item.

12. A storage system in combination with the system of claim 11, the storage system comprising:
  a first set of parallel rails or tracks extending in an X-direction, and a second set of parallel rails or tracks extending in a Y-direction transverse to the first set in a substantially horizontal plane to form a grid pattern including a plurality of grid spaces;
  a plurality of stacks of containers located beneath the rails, and arranged such that each stack is located within a footprint of a single grid space;
  at least one transporting device, the at least one transporting device being configured to selectively move in the X and/or Y directions, above the stacks on the rails and configured to transport a container;
  a picking station configured to receive a container transported by the at least one transporting device; and
  the grasping system, wherein the grasping system is arranged to grasp an item and place it in a container at the picking station.

13. The storage system according to claim 12, wherein the at least one transporting device has a footprint that occupies only a single grid space in the storage system, such that a transporting device occupying one grid space does not obstruct a transporting device occupying or traversing adjacent grid spaces in the X and/or Y directions.

14. A method of identifying an item to be retrieved from a flat storage surface by a robot, the method comprising:
  a. establishing a global coordinate system;
  b. establishing an orthonormal set of basis vectors u, v and w defined in the global coordinate system, where w is approximately orthogonal to the surface that items are stored on;
  c. receiving a depth map from a depth sensor;
  d. converting the received depth map into a 3D Point Cloud defined in the global coordinate system;
  e. computing a representation of a partitioning into segments of 3D Points of the 3D Point Cloud that were observed to be lying on surfaces of items that are to be retrieved, such that a segment contains a pair of 3D Points only if the 3D points are to be considered to be part of the surface of a same item;
  f. computing a right, enclosing prism for each segment;
  g. computing an outwards-pointing normal of each w-aligned face of each right enclosing prism;
  h. computing an outwards-pointing normal of each w-aligned edge of each right enclosing prism;
  i. computing which w-aligned edges of each right enclosing prism correspond to grasp points that are to be precluded from an item selection process;
  j. iterating over the w-aligned edges of each right enclosing prism that do not correspond to grasp points that are precluded from the item selection process;
  k. computing a pair of quadrilateral-based right prisms for each such a w-aligned edge;
  l. checking whether or not an interior of either of the two quadrilateral-based right prisms associated with a w-aligned edge intersects any of the right, enclosing prisms; and
  m. instructing the robot to retrieve the item based on the uv coordinates of one or more w-aligned edges whose associated quadrilateral-based right prisms do not have interiors that intersect any of the right enclosing prisms.

15. The method according to claim 14, wherein a base of each right enclosing prism is a simple polygon that is orthogonal to w.

16. The method according to claim 14, wherein each right enclosing prism contains all of the 3D Points that constitute its associated segment.

17. The method according to claim 14, wherein each right enclosing prism has minimal volume.

18. The method according to claim 14, wherein the pair of quadrilateral-based right prisms associated with any given w-aligned edge are adjacent to that edge's two neighbouring w-aligned faces.

19. The method according to claim 14, wherein bases of each quadrilateral-based right prism associated with any given w-aligned edge are parallel to the uv plane.

20. The method according to claim 14, wherein each quadrilateral-based right prism associated with any given w-aligned edge has four edges that are parallel to that w-aligned edge, and wherein one of these four edges lies in the plane containing that w-aligned edge and that w-aligned edge's normal.

21. The method according to claim 14, wherein for each quadrilateral-based right prism associated with any given w-aligned edge, minimal and maximal projections of the quadrilateral-based right prism's vertices onto the w axis are equal to minimal and maximal projections of the w-aligned edge onto the w axis.

22. The method according to claim 14, wherein the step of computing which w-aligned edges of each right enclosing prism correspond to grasp points are to be precluded from an item selection process comprises:
  a. computing uv coordinates of a first centroid of the flat storage surface;
  b. computing a second centroid of uv coordinates of the right, enclosing prism's vertices; and
  c. identifying the one or more w-aligned edges whose normals are closest in orientation to a vector that runs from the first centroid to the second centroid.

23. The method according to claim 14, wherein the step of computing which w-aligned edges of each right enclosing prism correspond to grasp points to be precluded from an item selection process comprises:
  a. computing a minimal area convex polygon K that encloses the storage surface's projection onto the uv plane;
  b. computing uv coordinates of the vertices of the right, enclosing prism;

c. excluding a given w-aligned edge's grasp points from the item selection process only if one of the following conditions holds:
  i. a minimal area convex polygon K encloses a projected edge of the right, enclosing prism, and translating that projected edge a predetermined distance in an opposite direction of the w-aligned edge's normal would cause the projected edge to cross an edge of the minimal area convex polygon K; or
  ii. part of a projected edge of the right, enclosing prism lies outside the minimal area convex polygon K, and translating that projected edge a user-specified distance in the opposite direction of the w-aligned edge's normal would move the projected edge further from a closest edge of the minimal area convex polygon K.

* * * * *